US006989829B2

United States Patent
Haga et al.

(10) Patent No.: US 6,989,829 B2
(45) Date of Patent: Jan. 24, 2006

(54) IMAGE PROCESSING DEVICE AND IMAGE PROCESSING METHOD

(75) Inventors: Norio Haga, Tokyo (JP); Tadanobu Numata, Tokyo (JP); Satoshi Mifune, Tokyo (JP); Makoto Yamamoto, Tokyo (JP); Kaori Yamamoto, Tokyo (JP); Masaki Yamashita, Kawasaki (JP)

(73) Assignee: Kabushiki Kaisha Sega Enterprises, Tokyo (JP)

( * ) Notice: Subject to any disclaimer, the term of this patent is extended or adjusted under 35 U.S.C. 154(b) by 0 days.

(21) Appl. No.: 09/171,236

(22) PCT Filed: Feb. 18, 1998

(86) PCT No.: PCT/JP98/00677

§ 371 (c)(1),
(2), (4) Date: Jul. 13, 1999

(87) PCT Pub. No.: WO98/35734

PCT Pub. Date: Aug. 20, 1998

(65) Prior Publication Data

US 2001/0040575 A1 Nov. 15, 2001

(30) Foreign Application Priority Data

Feb. 18, 1997 (JP) .............................................. 9-034089
Feb. 18, 1997 (JP) .............................................. 9-034163

(51) Int. Cl.
*G06G 15/00* (2006.01)

(52) U.S. Cl. ......................... 345/418; 345/619; 345/427

(58) Field of Classification Search ................. 345/427, 345/421, 419, 433, 619; 463/30–33
See application file for complete search history.

(56) References Cited

U.S. PATENT DOCUMENTS 5,363,297 A * 11/1994 Larson et al. ............... 364/410

(Continued)

FOREIGN PATENT DOCUMENTS

EP 0 714 685 A 6/1996
EP 0 758 117 A 2/1997

(Continued)

OTHER PUBLICATIONS

Han et al., Character Image Restoration Based on Characteristic Points, 1993, IEEE, pps. 1060–1063.*

(Continued)

*Primary Examiner*—Sumati Lefkowitz
*Assistant Examiner*—Motilewa Good-Johnson
(74) *Attorney, Agent, or Firm*—Keating & Bennett, LLP

(57) ABSTRACT

Games are processed in a more realistic and immediate manner during image processing for soccer games and the like. Specifically, the movements of characters more accurately simulate those of actual opponents, resulting in greater game realism.

The invention is an image processing device for imaging and displaying the behavior of characters modeled on opponents in virtual three-dimensional space. It is determined (S21 to S24) whether or not there exists a certain situation in which the relation to the game contents (in the centering area, for example) or the positional relation (such as distance) between characters and a target (such as opponent characters or the ball) having a relation through the game to said characters matches certain conditions, and the eyes of the characters are directed to the target (S25, S26, S28, etc.) when it is determined that the certain situation exists. The invention is especially suitable for soccer games.

32 Claims, 42 Drawing Sheets

U.S. PATENT DOCUMENTS

| | | | |
|---|---|---|---|
| 5,522,018 A | | 5/1996 | Takeda et al. ............... 395/122 |
| 5,651,104 A | * | 7/1997 | Cosman |
| 5,779,548 A | * | 7/1998 | Asai et al. .................... 463/31 |
| 5,947,823 A | | 9/1999 | Nimura ........................ 463/32 |
| 5,973,704 A | * | 10/1999 | Nishiumi et al. ........... 345/475 |
| 5,990,896 A | * | 11/1999 | Barrus ........................ 345/420 |
| 6,078,329 A | * | 6/2000 | Umeki et al. ............... 345/419 |
| 6,454,652 B2 | * | 9/2002 | Miyamoto et al. ............ 463/31 |

FOREIGN PATENT DOCUMENTS

| | | |
|---|---|---|
| EP | 0 773 515 | 5/1997 |
| JP | 5-249953 | 9/1993 |
| JP | 5-333850 | 12/1993 |
| JP | 06277362 A | 10/1994 |
| JP | 07178242 A | 7/1995 |
| JP | 08084861 A | 4/1996 |
| JP | 08155143 A | 6/1996 |
| JP | 08161530 A | 6/1996 |
| JP | 08215432 A | 8/1996 |
| WO | 89/09458 | 10/1989 |
| WO | 96/25211 | 8/1996 |
| WO | 96/34364 | 10/1996 |
| WO | WO 97/14102 | 4/1997 |

OTHER PUBLICATIONS

Japanese Abstract of 8–816515 published on Jun. 21, 1996.

Japanese Abstract of 7–178242 published on Jul. 18, 1995.

I.E.E.E. Montani, "Vector and Raster Hidden–Surface Removal Using Parallel Connected Stripes," Computer Graphics and Applications, Jul. 1987.

Kiyohiro Morii et al., "Computer Graphics Eye–Animation and Feeling of Gaze Line," Electronics and Communication in Japan, Nov. 1995, pp. 39–51, vol. 78, Kyoto, Japan.

Monheit, G. et al., "A Kinematic Model of the Human Spine and Torso", IEEE Computer Graphics and Applications, Mar. 1, 1991, pp. 29–38, vol. 11, No. 2, IEEE Inc., New York, USA.

"International Superstar Soccer 64", ONLINE!, Sep. 3, 1997, pp. 1–10, Retrieved from the Internet: URL:ign64.ign.com/reviews/1996.html, retrieved on Feb. 14, 2000.

* cited by examiner

| TIME ZONE | CORRECTION |
|---|---|
| 5:30 ~ 6:00 | CORRECTION WITH NIGHT AND DAYTIME |
| 6:00 ~ 16:30 | NO CORRECTION (DAYTIME STANDARD TIME ZONE) |
| 16:30 ~ 17:00 | CORRECTION WITH DAYTIME AND EVENING |
| 17:00 ~ 18:30 | NO CORRECTION (EVENING STANDARD TIME ZONE) |
| 18:30 ~ 19:00 | CORRECTION WITH EVENING AND NIGHT |
| 19:00 ~ 5:30 | NO CORRECTION (NIGHT STANDARD TIME ZONE) |

VERTEX P1 ;
ANGLE : C000
COORDINATES(−10,−5)

VERTEX P2 ;
ANGLE : C000
COORDINATES(10,−5)

LINE POLYGON

VERTEX P3 ;
ANGLE : 4000
COORDINATES(−10,−4)

VERTEX P4 ;
ANGLE : 4000
COORDINATES(10,−4)

DEPTHWISE MOVEMENT z AXIS DIRECTION

0 DEGREES x AXIS DIRECTION

LEFT MOVEMENT

RIGHT MOVEMENT

0 DEGREES

15 DEGREES

IMAGE PROCESSING DEVICE AND IMAGE PROCESSING METHOD

TECHNICAL FIELD

The present invention relates to an image processing technique suitable for use in image processing devices such as TV games in which characters (objects, in the broader sense) are situated in virtual space to play a soccer game or the like, and more particularly to an image processing technique for making games seem more realistic and more immediate by executing various processes such as control of a character's eye direction, control of a character's behavior, and fog processing to adjust the colors on the screen. The present invention also relates to an image processing technique which provides images that are easier for players to see by suitably controlling the angle of the virtual camera relaying the developing situation in a game or the orientation of objects situated in the game field.

BACKGROUND ART

Progress in recent computer technology has led to the widespread popularization of image processing techniques for TV games, simulation devices, and the like. The sophistication of image processing techniques which more realistically portray display contents and display screens is extremely important in enhancing commercial value.

The components of TV games, for example, comprise peripherals, including a display monitor and operating instruments such as pads and joysticks, as well as processors with a CPU that executes image processing, audio processing, data transmission with the peripherals, and so forth, allowing interactive games to be played with such operating instruments.

Game devices allowing soccer games to be played are one of the fields of such TV game machines. In such soccer games, a soccer stadium with a field and spectator seats (stands) is commonly constructed in three-dimensional virtual space, and the characters (referred to as display objects or objects) of two teams play a virtual soccer game on the field. Specifically, motion is computed according to operating data from players, the ball is processed, collisions (hits) are processed, robots are processed, the field is processed, and the like, in sequence, and game development reflecting the manipulation by players is displayed on screen.

Because the behavior of the spectators in the stands is also an important element contributing to the game environment at this time, the behavior of the spectators is also often processed. Examples of methods for controlling the behavior of spectators include: 1) methods in which a great deal of image data of moving spectators is prepared in advance for each frame, in the same manner as with animation (moving images), and images are mapped with texture according to the competitive scenario and are displayed in moving images; and 2) methods in which polygons showing spectators are prepared, and the polygons are moved according to the competitive scenario.

The problem of whether or not the display screen coloration matches the actual brightness (such as sunlight) over time throughout the day is another important element in enhancing the game environment or immediacy. This is a particularly important feature of soccer games since they are often played out-of-doors, and there are subtle changes in the physical environment related to brightness depending on the time zones during the day in which the soccer game is played. In other words, the brightness changes depending on which time zone—morning, afternoon, or evening—in which the game is being played and where in those times zones the game is being played. A method for adjusting the luminance of the color screen according to time zone has been known in the past.

However, the aforementioned game machine suffers from the following drawbacks in terms of game immediacy and realism.

First, using soccer games as an example, when characters play against each other while dribbling the ball in conventional game machines, the characters can dribble only while facing in the direction in which they are running. However, when shooting or passing to a team mate while dribbling in actual soccer games, the athlete that is dribbling looks (looks around) in the same direction in which he is running or in other directions in order to plan the timing of kicks or to look for a kicking zone or team mates. That is, it is difficult to realistically simulate the actual behavior of soccer players just by controlling running motions while dribbling, and the actions of the characters on the display screen are primitive and unnatural. The control of the direction in which a character is facing (that is, the eye direction) is the same for the player who is running while dribbling as well as for other players who do not have the ball. Home team characters also naturally turn their faces (eye direction) depending on the actions of the characters of the opposing team, but no such control has been managed in the past.

Second, the behavior of spectators is also an important element affecting the immediacy of a game. In the past, however, the varying movements of individual spectators (more realistic behavior), simplicity of software design, reduction in computing load, decrease in memory capacity, and the like have not been satisfactorily achieved simultaneously.

In cases where spectators are displayed with animated texture mapping as in the past, the low number of frames showing movement results in crude and discontinuous spectator movement. The number of frames is increased in an effort to avoid this. As a result, the image data that is handled increases, requiring greater memory capacity Software design also becomes more complicated, and the computing load increases. When the load increases too much, character (or object) control is hindered, resulting in the need to conserve spectator load. However, when spectator control is scaled back for such conservation, the screen that is displayed is not very exciting and lacks immediacy.

On the other hand, when spectators are displayed with polygons, the number of spectators which can be displayed with polygons is extremely limited when taking into account the burden involved in controlling them. If the computing load for such control is disregarded, it might be possible to display individual spectators with polygons and to individually control their movement, but that would actually be difficult for large numbers of spectators. Only specific (selected) main spectators should be displayed with polygons. In fact, spectators do have individually different movements, but they sometimes move the same in groups. The main movements of the specific spectators thus lack excitement and immediacy.

Third, conventional devices are not able to cope with the requirements of game machines nowadays in terms of controlling the physical environment relating to the actual brightness during the day. For example, the display screen should match the surrounding environment of players who enjoy the soccer game while sitting in front of the game machine in given time zones throughout the morning, afternoon, or evening. However, when the luminance of the entire screen is merely adjusted, as in conventional devices, the screen becomes darker as night approaches, making it all the more difficult to play.

Fourth, when games which unfold in virtual three-dimensional space are displayed on a screen, the ease of game playability varies depending on the direction of the camera eye direction by which the virtual camera relaying the game sees the characters (or objects). The ease of game playability also varies depending on the position of the virtual camera. The three-dimensional display of objects should be emphasized according to the game development area.

Fifth, when games in virtual three-dimensional space are displayed on a screen, the point of view and position of the virtual camera should be pulled back to display as much of the game field as possible on the screen to make it easier for players to play the game. When such processing is managed, the lines and markers indicating the range of the sports game court are narrow as compared the entire virtual space, and they thus disappear because of the screen resolution. Thicker lines have thus been prepared to prevent such disappearance. However, when the camera zooms up (the point of view approaches the main point of view) to enhance game excitement, especially thick lines are displayed, which are unnatural.

In view of the aforementioned problems, an object of the present invention is to provide an image processing device and method allowing games to be processed in a more realistic and immediate manner during image processing for soccer games and the like, so as to allow the more recent requirements of game devices to be adequately dealt with.

Another object of the present invention is to achieve more accurate simulation, so that the movements of the characters are more like the movements of actual competitors during image processing of games such as soccer games, resulting in a more realistic game.

Yet another object of the present invention is to more realistically represent the movements of spectators during image processing of games such as soccer games, resulting in far greater game immediacy.

Another object of the present invention is to provide a screen in which the color display is adjusted according to the state of the light source in the environment of the time zone in which players are actually playing a game during image processing of games such as soccer games, further enhancing game immediacy.

An object of the present invention is to provide novel means for suggesting game situations to players based on the actions of more accurately simulated characters, and novel means for adjusting the playability of the game.

An object of the present invention is to provide a more easily seen game screen ensuring the display of objects that are necessary to the players, in such a way that objects which have a specific function in three-dimensional virtual game space but which tend to disappear in the conversion to two-dimensional images still remain in the two-dimensional game screen even when they are smaller.

An object of the present invention is to provide an image processing device for controlling the eye direction and direction of the camera or the position of the virtual camera according to the relative positional relation between the virtual camera and characters or areas in the game field, and for forming a screen with a more favorable perspective for the player in such areas.

DISCLOSURE OF THE INVENTION

To achieve the aforementioned objects, the image processing device of the present invention is a device that displays the behavior of characters modeled on opponents in virtual three-dimensional space, comprising determination means for determining whether or not there exists a certain situation in which the relation to the game contents or the positional relation (such as distance) between characters and a target (imaginary point) having a relation through the game to the aforementioned characters matches certain conditions, and eye direction control means for directing the eye direction of the aforementioned characters to the aforementioned objects when the determination means has determined the aforementioned certain situation exists. Any imaginary point in virtual space can be used instead of the target point.

For example, when the aforementioned game is a soccer game, the aforementioned target is a ball in the aforementioned soccer game. For example, the aforementioned eye direction control means may include means for rotating and controlling the torsos and waists of the aforementioned characters with the rotation of the heads of the aforementioned characters. The aforementioned determination means may include, for example, means for computing the angle from the aforementioned characters to the target based on coordinate values of the aforementioned characters and the aforementioned target in the aforementioned virtual three-dimensional space.

There are preferably a plurality of the aforementioned objects, and the aforementioned determination means preferably includes determination means for determining to which of the aforementioned plurality of targets the eye direction should be directed according to the aforementioned game situation.

The image processing method of the present invention is a method for displaying the behavior of characters modeled on opponents in virtual three-dimensional space, wherein a determination is made as to whether or not there exists a certain situation in which the relation to the game contents or the positional relation between characters and a target having a relation through the game to the aforementioned characters matches certain conditions, and the eye direction of the aforementioned characters is directed to the aforementioned target when it has been determined that the certain situation exists.

In the image processing method of the present invention, a determination is made as to whether or not certain conditions have been established while the aforementioned character is made to execute a first behavior, and the aforementioned character is made to execute a second behavior when the aforementioned certain conditions have been established, so that information on the developing game situation is suggested (or implied) to the player.

The image processing device of the present invention is a device for displaying the behavior of spectators in stands facing the playing field, comprising a plurality of polygons individually mapped with textures modeled on a plurality of spectators, the aforementioned plurality of polygons being virtually superposed, and polygon oscillation means for moving the plurality of polygons in the directions intersecting the directions in which the polygons are superposed.

The aforementioned plurality of polygons are preferably virtually superposed, while the plurality of polygons that form the various plurality of objects are interleaved according to the sequence of objects, and the aforementioned polygon oscillation means is preferably a means for periodically moving the aforementioned plurality of objects while synchronized and linked with each object. The aforementioned moving direction is preferably the vertical or lateral direction of the aforementioned polygons.

The image processing method of the present invention is a method for displaying the behavior of display spectators in stands facing the playing field in virtual three-dimensional space, wherein a plurality of polygons individually mapped with textures modeled on a plurality of spectators are virtually superposed, and the aforementioned plurality of polygons are moved in directions intersecting the directions in which the polygons are superposed.

The image processing device of the present invention is a device for simulating and displaying games in virtual three-dimensional space, comprising sensing means for sensing the time of the aforementioned game being played by a player, and adjusting means for partially or completely adjusting the screen colors of the aforementioned images according to the time sensed by the sensing means. For example, the aforementioned adjusting means may comprise memory means by which data on predetermined screen color states of at least two standard time zones with brightness most suited to the game during the day are stored in the form of various reference values, and data generating means which, when the game time sensed by the aforementioned sensing means is within either of the aforementioned standard time zones, generates masking data for the game display screen based on the corresponding one of the aforementioned reference values, and which, when the aforementioned time is not within either of the aforementioned standard time zones, generates the aforementioned masking data based on data for the screen color state interpolated on the basis of the two reference values temporally prior to and following the aforementioned time in the aforementioned at least two reference values.

The image processing method of the present invention is a method for simulating and displaying games in virtual three-dimensional space, wherein the real time during the day in which the player plays the aforementioned game is sensed, and the screen color of the aforementioned images are adjusted according to the real time.

The image processing device of the present invention is an image processing device for situating objects in virtual space formed by a computer system, developing a game while controlling the movements of the aforementioned objects according to input control and set rules, and displaying circumstances in the aforementioned virtual space as the screen seen from a virtual camera, comprising polygons situated on a reference plane serving as the reference in the aforementioned virtual space, determination means for determining the positional relation between the aforementioned polygons and the aforementioned virtual camera, and polygon tilting means for tilting the aforementioned polygons, according to the results of the determination, so as to increase the surface area of the aforementioned polygons seen from the aforementioned virtual camera.

The aforementioned reference plane is preferably the ground, and the aforementioned polygons are preferably polygons forming lines situated on the aforementioned ground.

The aforementioned polygons have a plurality of sides, and the aforementioned polygon tilting means modifies the coordinate values of the vertices on one of the sides of mutually facing sides of the aforementioned polygons.

The image processing device of the present invention is an image processing device for situating objects in virtual space formed by a computer system, developing a game while controlling the movements of the aforementioned objects according to input control and set rules, and displaying circumstances in the aforementioned virtual space as the screen seen from a virtual camera, comprising determination means for determining whether or not the aforementioned objects are in a specific area in the aforementioned virtual space, and camera angle adjusting means for adjusting the angle of the aforementioned virtual camera based on the results of the aforementioned determination.

The aforementioned camera angle adjusting means preferably adjusts the angle of the aforementioned virtual camera based on the results of the aforementioned determination and the direction in which the aforementioned objects are moving.

The aforementioned camera angle adjusting means preferably adjusts the angle of the aforementioned virtual camera in at least one of either the lateral and vertical directions in the aforementioned virtual space.

The image processing device of the present invention is a device for situating objects in virtual space formed by a computer system, developing a game while controlling the movements of the aforementioned objects according to input control and set rules, and displaying circumstances in the aforementioned virtual space as the screen seen from a virtual camera, comprising determination means for determining whether or not the aforementioned objects are in a specific area in the aforementioned virtual space, and zoom adjusting means for adjusting the range of the field of vision of the aforementioned virtual camera based on the results of the aforementioned determination.

The image processing device is an image processing device having an image generating display means for converting virtual space constructed with a three-dimensional model consisting of a plurality of polygons to two-dimensional images seen from a virtual camera in any position, and displaying them on a display device, comprising angle computing means for computing the angle between an eye direction vector showing the direction in which the aforementioned virtual camera is facing (camera eye direction) and a normal line vector showing the orientation of the plane of certain polygons situated in the aforementioned virtual space, and polygon tilting means for changing the coordinate values of the vertices of the aforementioned polygons, so that the angle computed by the aforementioned angle computing means assumes a certain value.

The image processing device of the present invention is an image processing device having image generating display means for generating two-dimensional images that reveal, from any point of view (or a virtual camera), virtual space constructed with a three-dimensional model consisting of a plurality of polygons, and for displaying them on a display device, wherein the aforementioned polygons comprising nondisappearing polygons which have attributes preventing them from disappearing and which contain data for operating a program to prevent polygons from disappearing, the aforementioned disappearance prevention program comprises position determination means for determining the positional relation between the aforementioned nondisappearing polygons and the aforementioned point of view, and coordinate modification means for modifying the coordinate values of the vertices of the aforementioned nondisappearing polygons according to the results of the determination by the aforementioned position determination means, and the aforementioned image processing device furthermore comprises disappearance prevention execution means for executing the aforementioned disappearance prevention program when the polygons visualized on the aforementioned display device are the aforementioned nondisappearing polygons.

The data recording media of the present invention record a program for allowing a computer system to function as any of the aforementioned image processing devices.

BEST MODE FOR CARRYING OUT THE INVENTION

A first embodiment of the present invention is described below with reference to FIGS. 1 through 22, a second embodiment is described with reference to FIGS. 23 through 31, and a third embodiment is described with reference to FIGS. 32 through 58. These embodiments relate to games integrally incorporating the image processing device of the present invention. The application software in these cases assume soccer game software as an example, but they may similarly be implemented with other types of software such as that for baseball games, soft ball games, and basket ball games.

Figure 1:
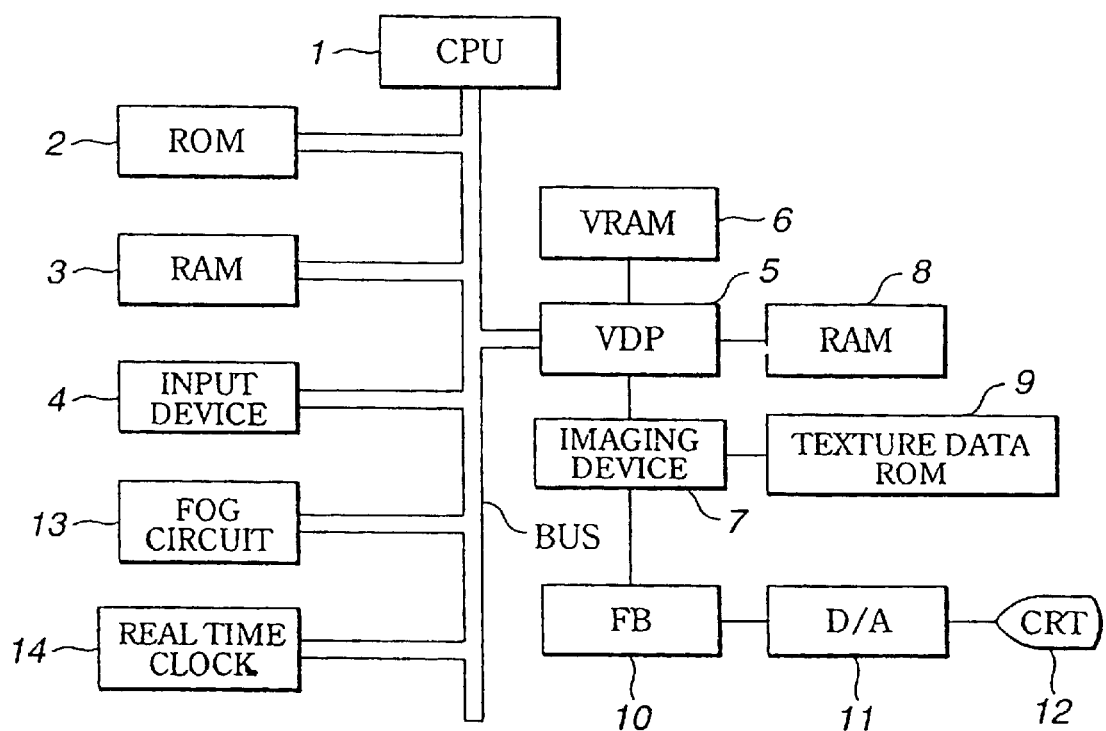
FIG. 1 is a block diagram depicting the functional structure of the game machine in an embodiment of the present invention.

FIG. 1 schematically illustrates the block structure of the game device pertaining to the first embodiment. The game device has a CPU (central processing unit) 1, with ROM 2, RAM 3, an input device 4, and a video display processor (VDP) 5 all connected by a bus to this CPU 1. The CPU 1 sequentially executes the game program previously stored in ROM 2. The various processes pertaining to the present invention are realized as the VDP 5 periodically executes the program stored in ROM 2. Three processes relating to the present invention include the process by which the sight of line of the characters is controlled, the process by which spectator behavior is controlled, and the process of fog control in the form of display screen color adjustment. In addition to the program processed by the CPU 1 or VDP 5, character polygon data as well as the programs and fixed data necessary for the three processes (such as spectator polygon data and fog reference data) are previously stored in ROM 2.

The operating RAM 3 temporarily stores various types of data during the execution of the game. The input device 4 is equipped with an instrument operated by the player, such as a joy stick, and is used to input the data necessary for executing the game, such as when controlling the movement and motions of characters.

A video RAM (VRAM) 6, imaging device 7, and operating RAM 8 are connected to the VDP 5. Polygon data from ROM 2 is stored in VRAM 6. The polygon data comprises coordinate data for the number of vertices which are to be displayed and color data given in the form of color palettes for the vertices. The VDP 5 has a digital signal processor (DSP). In response to periodic timing signals such as the frame switching timing, the VDP 5 actuates and executes an image processing-dedicated program previously stored in ROM 2. The coordinates of the polygon data stored in VRAM 6 are converted and processed as a result of processing by the BDP 5, and are transferred to the imaging device 7.

A texture ROM 9 and frame buffer memory 10 are connected to the imaging device 7. Texture is mapped by the imaging device 7 to the polygon data which has undergone coordinate conversion, and is written in the form of pixel data per frame (screen) to the frame buffer memory 10.

The frame buffer memory 10 is connected by a D/A convertor 11 to an image processing device 12 such as a CRT. The D/A convertor 11 functions as a video signal generating circuit, reading pixel data from the frame buffer memory 10 and converting it to analog signals. The converted data is sequentially sent in the form of video signals to the display device 12, and images are displayed.

The game device also comprises a fog circuit 13 and real time clock 14 which are connected to the bus BUS. The real time clock 14 has a time and calendar function, so as to give real daily time data to the CPU 1. As is described below, the fog circuit 13 has what is referred to as a "fog function," which involves adjusting the display screen color through masking using specially established color data, referred to as fog data, according to the time in which the game device is operated (that is, the real daily time in which the game device is being played by a player), and generates fog data under the control of the CPU 1 and transmits it to the VDP 5.

Figure 2:
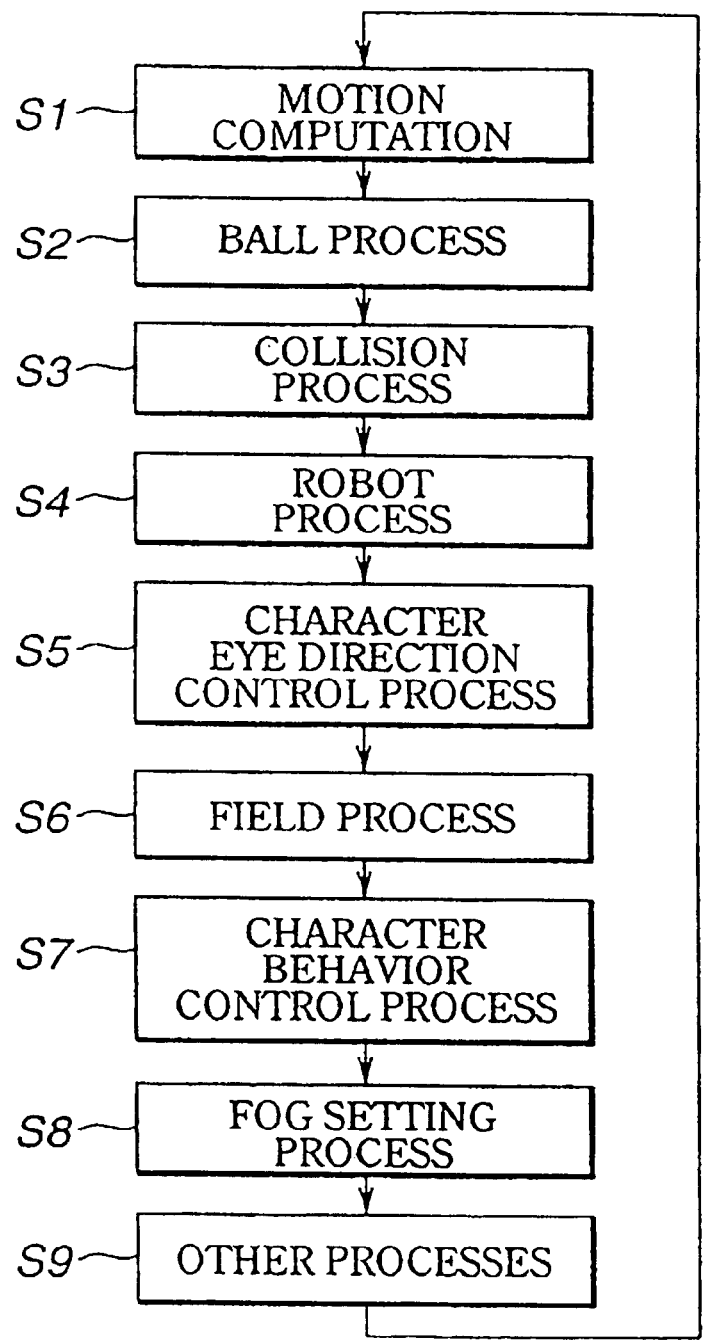
FIG. 2 is a schematic flow chart outlining the CPU processing.
Figure 3:
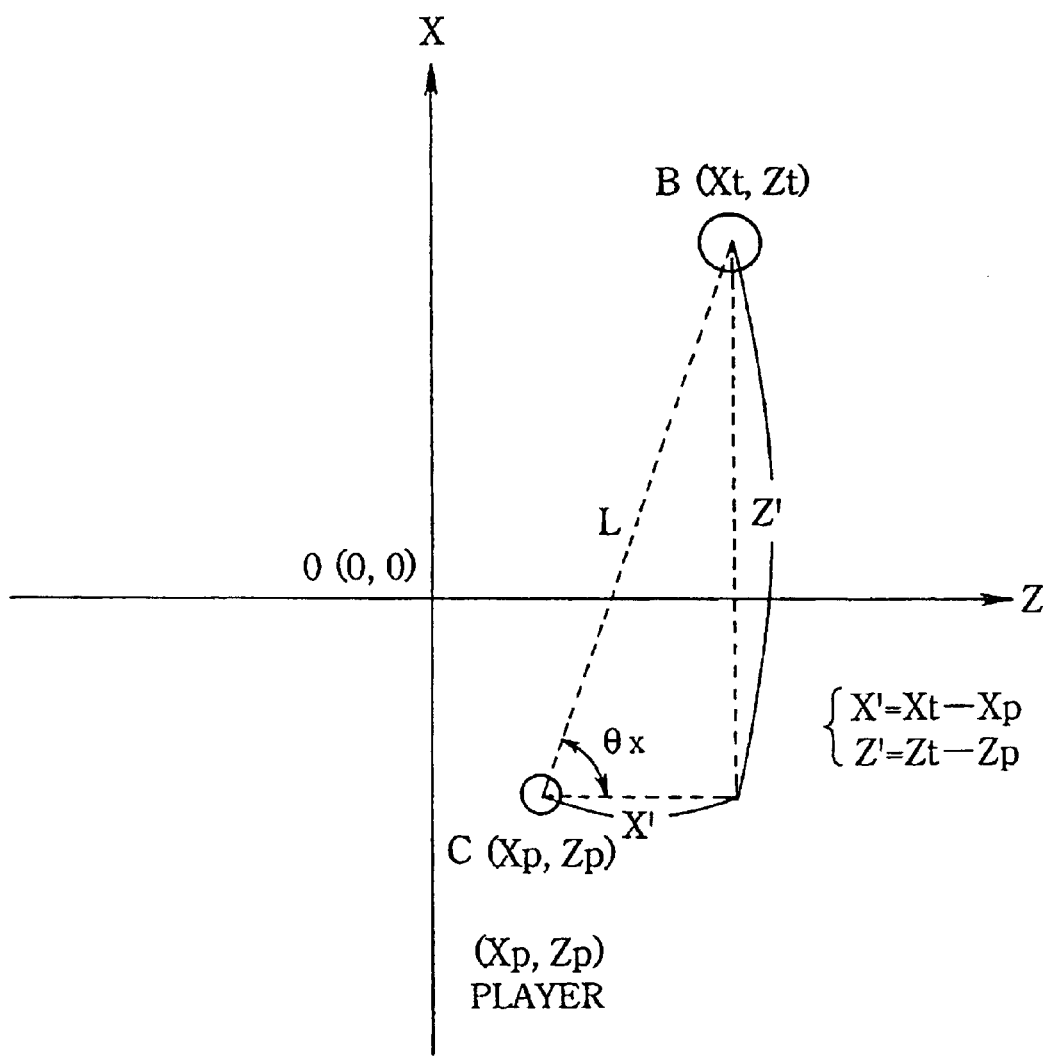
FIG. 3 illustrates the angle computation in the control of the eye direction.

FIG. 2 illustrates an example of processing per frame executed by the CPU 1. First, the CPU 1 receives from the input device 4 character motion commands (such as running, turning, and kicking the ball) corresponding to operating data from the player, and computes the motion of characters in three-dimensional virtual space (S1).

The CPU 1 then processes the ball (S2) in three-dimensional virtual space, such as advancing the soccer ball position, and processes collisions (hits) (S3) in three-dimensional virtual space. The collision processing is the determination and processing of various types of collisions, such as that between characters and the ground, between characters, and between characters and the ball. The CPU 1 then processes the behavior of the characters (robots) operated by the player in three-dimensional virtual space in response to operating data from the player (S4).

The CPU 1 also processes the control of the eye direction of the characters (S5). This control of the eye direction constitutes a characteristic feature of the present invention in an effort to provide more diverse character action during the game and to enhance the realism of the soccer game. This process is described in detail below.

When the process for controlling the eye direction is complete, the CPU 1 processes the soccer game field (S6). This field processing involves issuing commands for processes necessary to the game as the positions of the characters present in the field in virtual three-dimensional space are used as reference to determine which characters are in the offside line and which characters are in the goal area so as to advance the game.

The CPU 1 then processes the control of spectator behavior (S7) and issues commands for fog control (S8). These two processes also constitute part of the characteristic features of the present invention. The process of controlling spectator behavior is an attempt to enhance realism and immediacy by representing a variety of spectator behaviors while suppressing the computing load, and is described in detail below. The process of fog control is an attempt to enhance realism and immediacy by controlling the brightness of the screen according to the time throughout the day (color adjustment based on whether the game is played during the day or at night) in which the game is actually being played by the player, and is described in detail below. Finally, other necessary processing is executed (S9).

Only the main point of view of the character is determined in the control of the point of view in step S5; the motion of actually turning a character may be managed in the subsequent processing time S1. Step S4 may be similarly managed. In other words, a timing of at most about ⅟60 second can be established from the data acquisition and determination of the main point of view until the motion is actually carried out in the relevant direction.

The CPU 1 repeats the aforementioned processing for each frame. Thus, as the game unfolds, the CPU 1 sends commands for motion and the like corresponding to the manipulations of the player to the VDP 5. The necessary polygon data is transferred from the ROM 2 to the VDP 5 under the control of the CPU 1. The VDP 5 temporarily stores the polygon data in the VRAM 6, the polygon data undergoes coordinate conversion from virtual three-dimensional space to perspective two-dimensional space according to the commands, and the converted coordinates are transferred to the imaging device 7. The imaging device 7 maps texture to the polygon data that has undergone coordinate conversion and writes it to the frame buffer memory 10. As a result, images with new pixel data are displayed on the display device 12 for each frame.

The process for the control of the aforementioned character eye direction is described below with reference to FIGS. 3 through 7. This process is the step executed in step S5 in FIG. 2.

Figure 4:
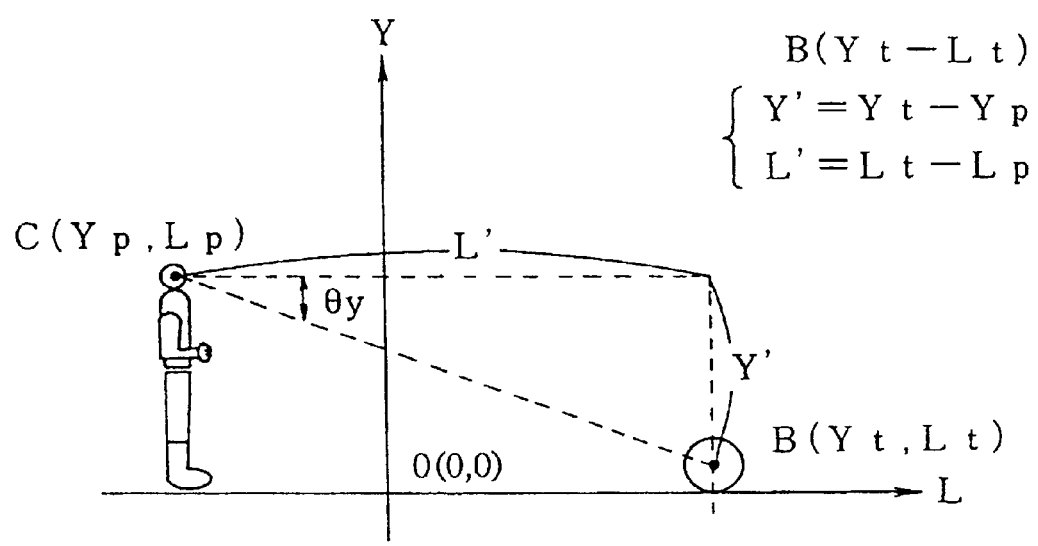
FIG. 4 illustrates the angle computation in the control of the eye direction.

The principles of angle computation determining the direction of the eye direction of a character C are described first. Here, the character C is assumed to be located at coordinates (Xp, Yp, Zp) in three-dimensional virtual space, and the soccer ball B serving as the target is located at coordinates (Xt, Yt, Zt) in the same space. In this case, based on the geometry viewed from the direction of the Y axis in FIG. 3, the following values can be calculated:

$X'=Xt-Xp$ $Z'=Zt-Zp$ and the angle $\theta y$ and distance L on the X-Z plane between the character C and the ball B can be calculated from the values X' and Z'. Similarly, the distance L between the character C and the ball B on the horizontal axis can be obtained based on this geometry, and the geometry obtained when the vertical axis is the Y axis can be imagined as depicted in FIG. 4. In other words, the coordinates (Yp, Lp) for the character C and the coordinates (Yt, Lt) for the ball B can be determined. In this case, the values $Y'=Yt-Lt$ $L'=Lt-Lp$ can be calculated, and the angle $\theta y$ at which the character C sees the ball B on the Y-L plane can be calculated based on Y' and L'. In other words, the eye direction when each character looks at the ball, for example, is determined by the parameters $\theta y$, L, and $\theta x$. The target is not limited to the ball, and can be similarly calculated when another player, the goal, or referee. In other words, it may be managed by giving the coordinates of one's own character and the coordinates of a given point for another player or referee or the coordinates of a central position such as of a goal.

Figure 5:
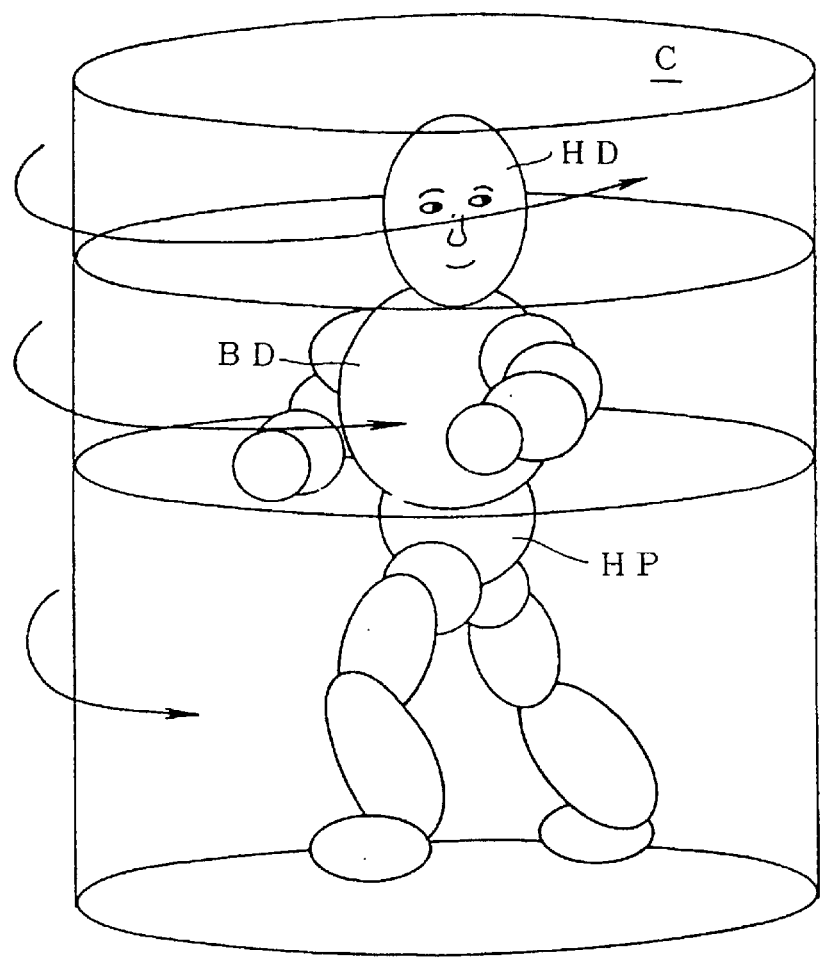
FIG. 5 illustrates the appearance of a character during control of the eye direction.

The direction of the eyes is determined in this manner, but the character's body faces in a variety of directions (way of turning) while his eyes are directed in that direction. FIG. 5 illustrates this. In the present embodiment, the head HD, torso BD, and waist HP of the character C are given as components where the body turns (rotates) during the control of the eye direction. Thus, modes of turning such as 1) when the head HD turns first (vertical or lateral turn), the torso BD then turns, and the waist HP then turns;

2) when the head HD and torso BD first turn simultaneously, and the waist HP then turns; and 3) when only the torso HD turns can be controlled for each situation in which the character is situated for each game scenario. This control may be managed, for example, by storing the angle to which each part HD, BD, and HP turns per frame, giving commands for motion based on a slight increase in the angle of the current turning angle in subsequent frames, and terminating the turning motion commands at the frame where the calculated angles $\theta x$ and $\theta y$ are reached for each body part.

In general, the movements of the human body are based on natural structural principles, and body movements appear most natural if these natural principles are applied when characters are set in motion. For example, when a body is turned, as indicated in FIG. 5, the neck turns the most rapidly, followed by the upper half of the body, and lastly by the entire body. Thus, when a body is turned, the neck should turn faster than the upper half of the body, and the upper half of the body should turn faster than the whole body.

By having the torso BD begin to turn when the turning angle of the head HD reaches a certain value, the turning body may be represented as the turning timings of the head, torso, and waist are staggered.

Figure 6:
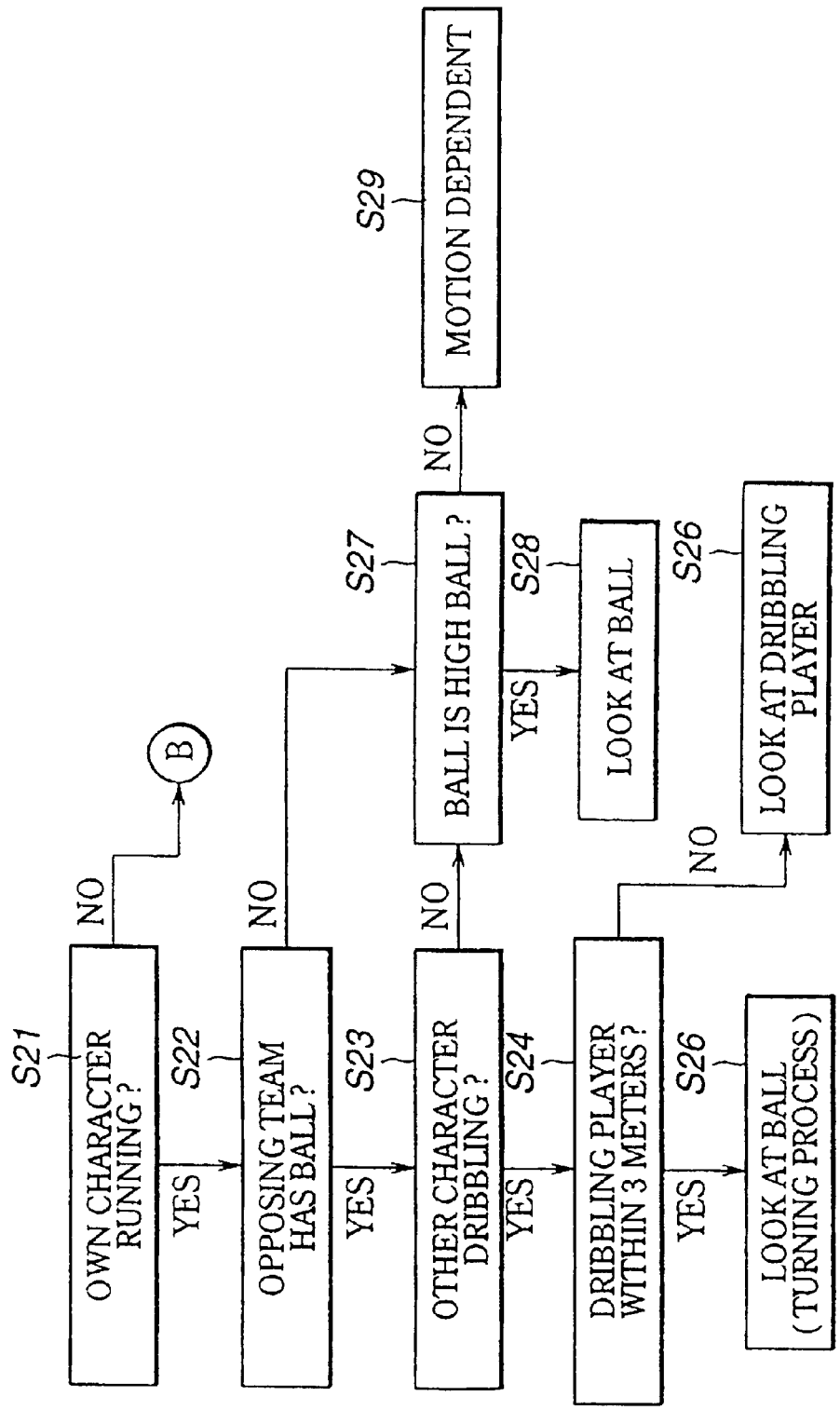
FIG. 6 is a schematic flow chart depicting an example of the control of the eye direction.
Figure 7:
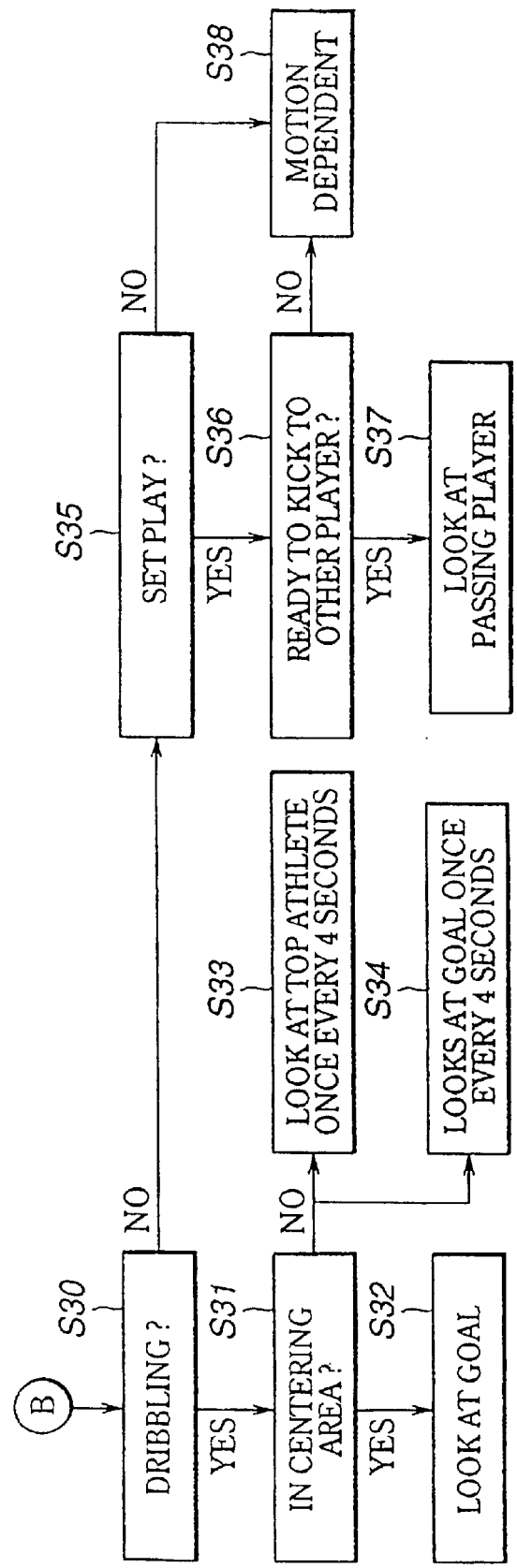
FIG. 7 is a schematic flow chart depicting an example of the control of the eye direction along with FIG. 6.

FIGS. 6 and 7 depict an example of the process for controlling the eye direction determined in this manner. The procedure for controlling the character eye direction can assume various forms. What is shown here is only an example, and the present invention is in no way limited to the examples. The process of controlling the eye direction may be carried out for all competitors (characters) on the field, or it may be carried out for only characters in a designated visual field to alleviate the computing load. It may even be carried out for only specific characters within the designated visual field, such as characters of particular concern (for example, characters in motion related to the ball or characters under the control of the player (individual playing the game device)).

As indicated in FIG. 5, for example, it is determined whether or not a given character is currently running, either YES (running) or NO (not running) (S21). If YES, it is furthermore determined whether or not the other team has the ball (S22). If the determination is YES (the other team has the ball), it is further determined whether or not a character on the other team is dribbling (S23). If YES (is dribbling), it is determined on the basis of the calculated distance values whether or not the dribbling character is within 3 meters (S24). If YES (within 3 meters), the eye direction of the character currently being controlled is directed toward the ball (S25). In the process of step 25, the turning process in FIG. 5 above is added. For example, since the character in step 25 is running, turning mode 1) is suitable, for example, in directing the character's eye direction to the ball while running.

If NO (not within 3 meters) in step S24, the eye direction of the character currently being controlled is directed to the character that is dribbling (S26). The turning control at this time may be in any of the forms described with reference to FIG. 5, and should be selected according to the type of angle relation with the other character at this time.

If NO (not dribbling) in step S23, and if NO (opposing team does not have the ball) in step S22, it is determined whether or not the current ball behavior is a "high ball" (S27). Here, a "high ball" is when the ball position is higher than the heads of the characters. If YES (high ball), a command is given to the character currently being controlled to direct his eyes to the ball (S28). On the other hand, if NO (not a high ball), the eye direction is not controlled, and the motion-dependent eye direction is maintained (S29). For example, since the character is at least running, the eyes are kept in the direction in which the character is running. "Motion dependent" means when the eye direction is not controlled and the movement of the character's action pattern (motion) determined by the program is used without further modification.

If NO in step S21, that is, when it has been determined that one's own character is not running, it is sequentially determined whether the character is dribbling (FIG. 7, S30) or is in the centering area (S31). If YES in step 31, since the character is dribbling and is in the centering area, the character will naturally aim at the goal. In this case, the character's eyes are directed at the goal (S32).

When the character is not in the centering ring in step S31, the character's eyes are directed to the top athlete at a rate of once every 4 seconds (S33), for example, and the character's eyes are directed to the goal at a rate of once every 4 seconds (S34). If NO (not dribbling) in step S30, it is determined whether or not the game is in set play (S35). If YES (set play), it is determined whether or not another character has decided to pass and is ready to kick (S37), and if YES, the eye direction is directed to the passing character (S37), whereas if NO, a motion-dependent eye direction is maintained without any special control of the eye direction (S38).

Figure 22:
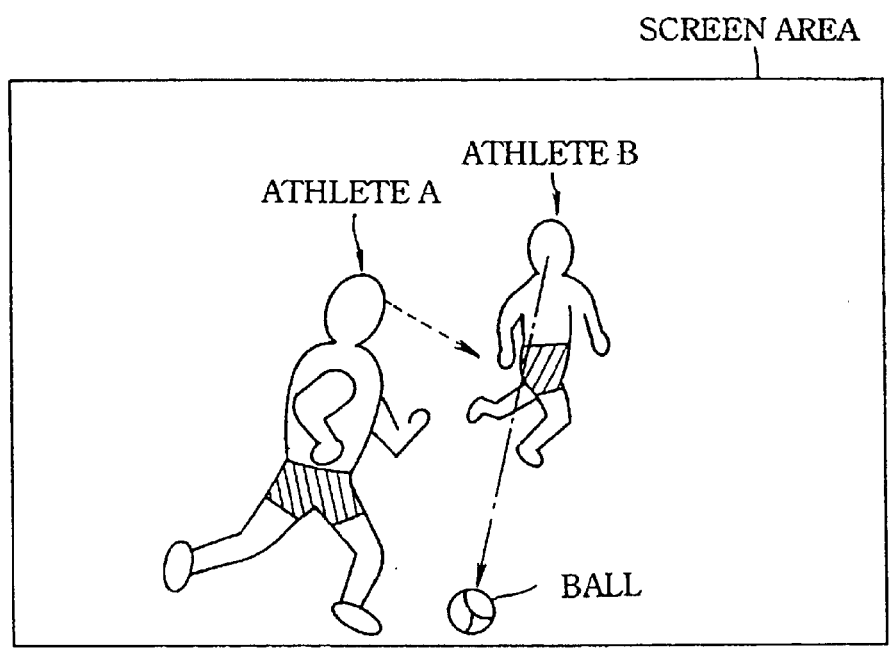
FIG. 22 is a schematic of an image displayed on a screen as a result of the control of the eye direction of a character.

FIG. 22 schematically depicts a screen displaying the results of the control of a character's eye direction. In the figure, athlete A directs his line of vision in the direction of athlete B (feet) who is the passing character. Athlete B directs his line of vision in the direction of the ball to be passed.

Controlling the character's eye direction in this manner allows the sports behavior of actual soccer games to be simulated far more closely. The eye direction is not longer the kind in which the ball is suddenly kicked in another direction while the character is facing the direction in which he is running, for example, as in the past. In such cases as well, the character's eyes are first directed in the direction of the kick or the intended kick, so the character's behavior can be more realistically portrayed, and a more exciting game device with better immediacy can be provided. Furthermore, when the eye direction is being controlled, not only the head is turned, but the torso or waist are also turned, either consecutively or simultaneously, as needed, allowing the behavior during the control of the eye direction to be realized in a more realistic manner.

Another advantage of the aforementioned control of the eye direction is that the direction in which the character's eyes are directed itself gives clues (suggests) to the player (individual playing the game device) what the character's next move will be. For example, when a dribbling character begins to direct his eyes frequently behind, it may be concluded that a character from the other team is approaching from behind, allowing the player (individual playing the game device) to avoid pursuit. The behavior of the characters can thus telegraph (suggest) situations in the game to the player (individual playing the game device).

Conversely, it is possible to make misleading suggestions in the determination steps in FIGS. 6 and 7. In other words, the eye direction can be deliberately directed in a direction completely different from the actual determination. This can confuse the judgment of the player (individual playing the game device), can further enhance the interest and excitement of the game device, and can increase the game difficulty.

The process of controlling spectator behavior is described below with reference to FIGS. 8 through 17.

Figure 8:
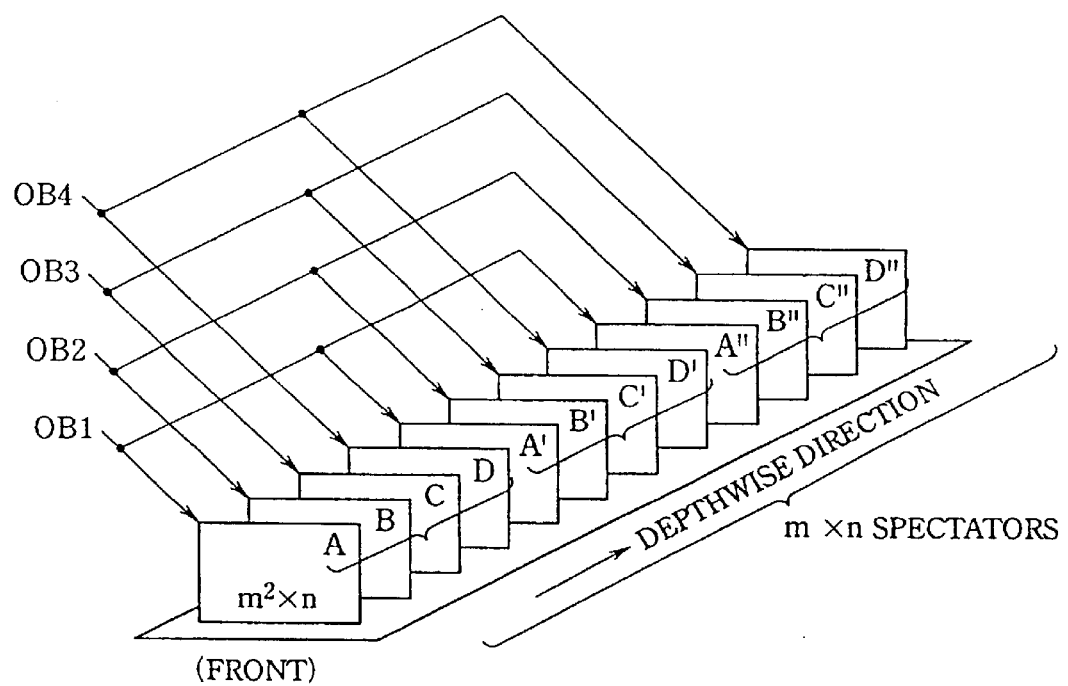
FIG. 8 illustrates the data structure of the spectator data based on polygons.

The structure of the image data (spectator data) for portraying the spectators in the present invention is described first with reference to FIG. 8. First, spectators are sitting in stands in which m (>2) columns of seats are increasingly higher the further back the stands go, and the spectators in these m columns are divided into n (>2) rows. Of these "m columns×n rows," "m' columns×n rows" of spectators per m' column (>0) are represented by mapping textures containing a plurality of spectators onto each rectangular polygon. For example, FIG. 8 shows the data structure in virtual space, where A through D, A' through D', and A" through D" indicate 12 rectangular polygons, and the polygons are layered based on a pattern which is increasingly higher in the depthwise direction of the stands. Each of polygons A through D, A' through D', and A" through D" is a single polygon, representing a plurality of spectators in 3 column (=m')×4 row (=n) portions, for example. The second polygon B located in virtual space behind (depthwise direction) the first polygon A assumes an initial state that is one column higher, for example, the third polygon C assumes an initial state that is one column higher, for example, and the fourth polygon D assumes an initial state that is one column higher, for example. As such, "14 columns×4 rows" of spectators, for example, are ranked in the stands by means of the 12 polygons A through D, A' through D', and A" through D".

The first four polygons A through D, for example, among the 12 polygons A through D, A' through D', and A" through D" are mutually connected in a spectator pattern, the next four polygons A' through D' are mutually connected in a spectator pattern, and the last four polygons A" through D" are mutually connected in a spectator pattern. At the same time, three polygons—the first, fifth, and ninth polygons A, A', and A"—among the 12 polygons A through D, A' through D', and A" through D" constitute one object OB1 in which they move in the same manner. Similarly, another three polygons—the second, sixth, and tenth polygons B, B', and B"—constitute one object OB2 in which they move in the same manner. Another three polygons—the third, seventh, and eleventh polygons C, C', and C"—similarly constitute one object OB3, and another three polygons—the fourth, eighth, and twelfth polygons D, D', and D"—constitute one object OB4. The spectator patterns of each object are not connected. That is, a characteristic feature of the spectator data in the present invention is that a plurality of polygons constitute one object while separated form each other in virtual space. The spectator patterns of each object need not be connected.

Figure 9:
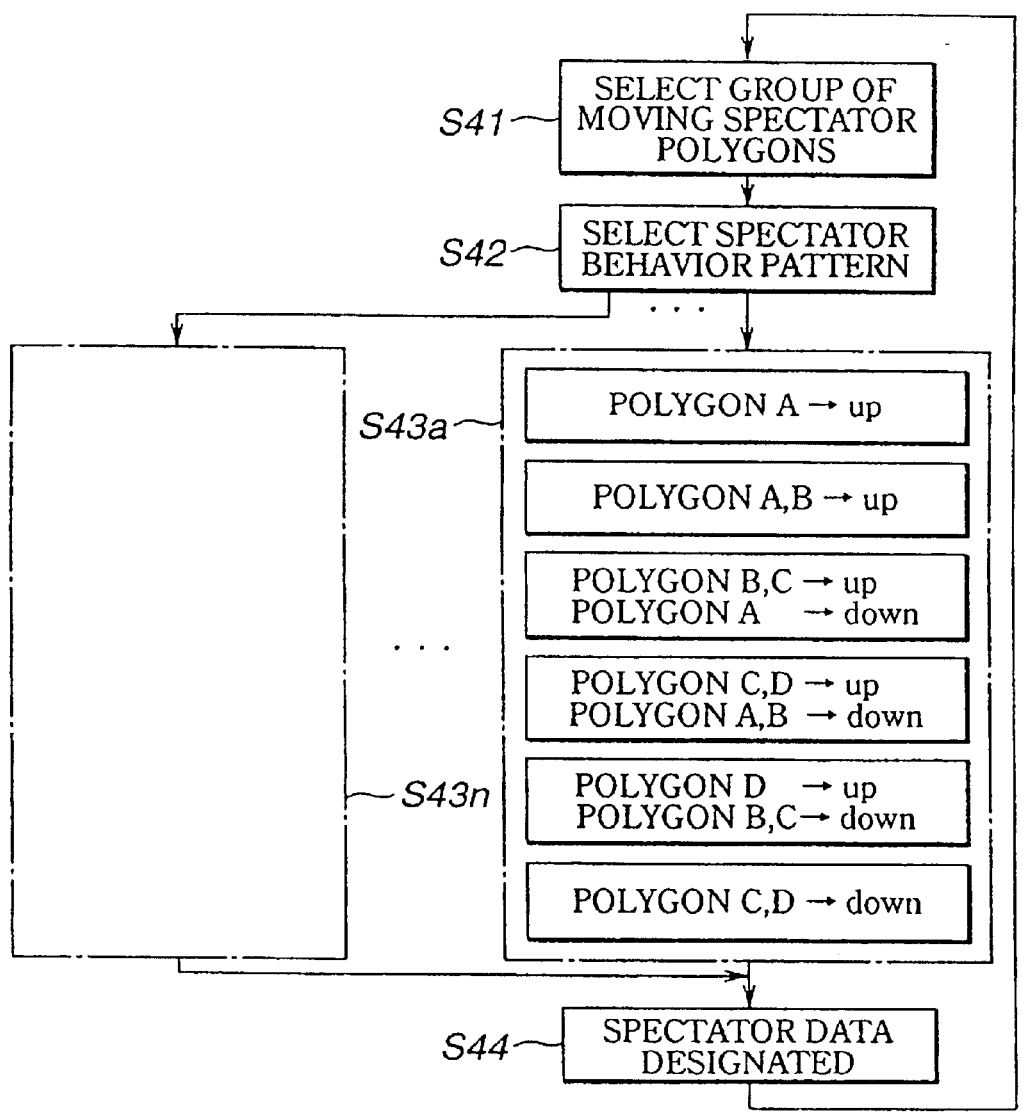
FIG. 9 is a schematic flow chart depicting an example of processing to control the behavior of spectators.

The process of controlling spectator behavior shown in FIG. 9 is executed by the CPU 1 using the data structured in this manner. That is, the CPU 1 determines the polygon groups whose behavior is controlled among all of the spectator data polygons (S41). Thus, any group of spectator polygons (such as the 12 polygons A through D, A' through D', and A" through D" in FIG. 10) ranked on the side of the team whom they are cheering, for example, may be selected from among the spectators seen from the virtual camera (point of view). A plurality of polygon groups may also be selected, of course.

The CPU 1 then selects a behavior pattern to move the determined (selected) polygon groups (S42). Patterns in which one or several groups of polygons are moved up and down (vertically) or side to side (laterally) have been prepared as behavior patterns. When the behavior pattern is selected, the CPU 1 executes the process for moving the one or more groups of polygons according to the selected behavior pattern (S43a through S43n).

Figure 10:
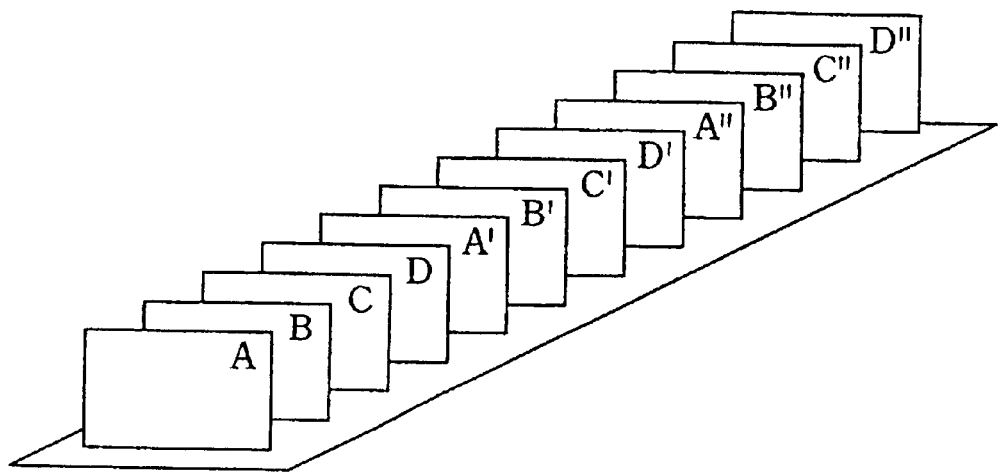
FIG. 10 illustrates a frame in an example of the control of spectator behavior.

FIGS. 10 through 17 depicts examples of ways to move the polygons. The polygon group in these figures is an example of one group and has the same data structure as in FIG. 8. FIG. 10 shows the state before the polygons are moved, and the state sequentially changes frame by frame to the states of the polygon positions shown in FIGS. 11, 12, 13, 14, 15, and 16, returning after several frames to the state of the polygon positions shown in FIG. 17 (same as FIG. 10).

Figure 11:
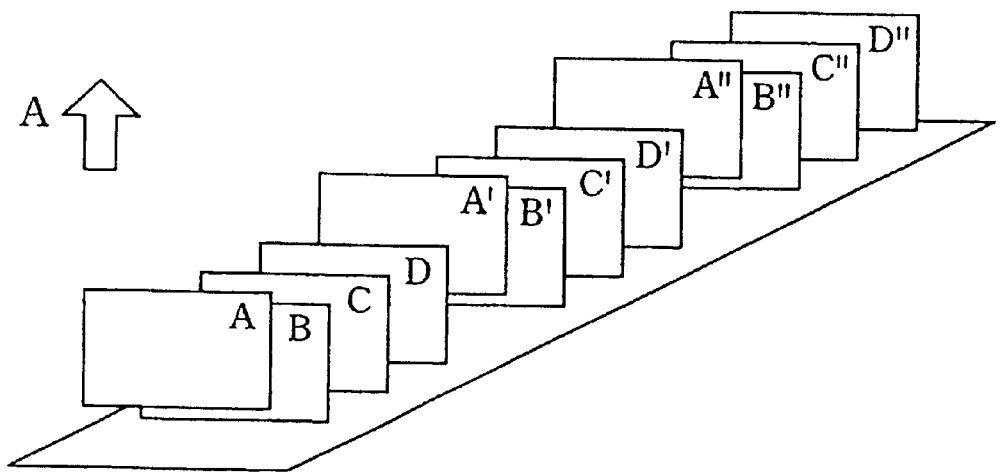
FIG. 11 illustrates another frame in an example of the control of spectator behavior.
Figure 12:
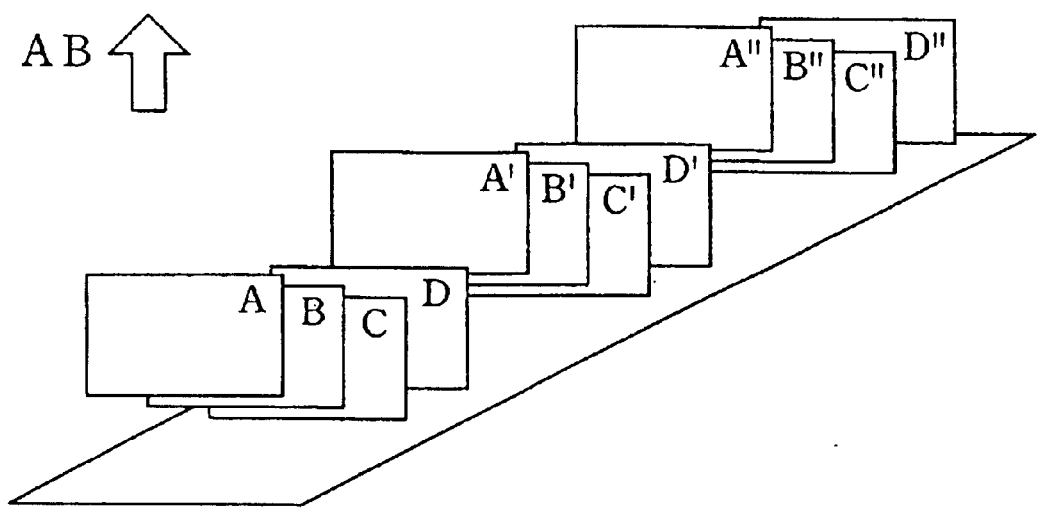
FIG. 12 illustrates another frame in an example of the control of spectator behavior.
Figure 13:
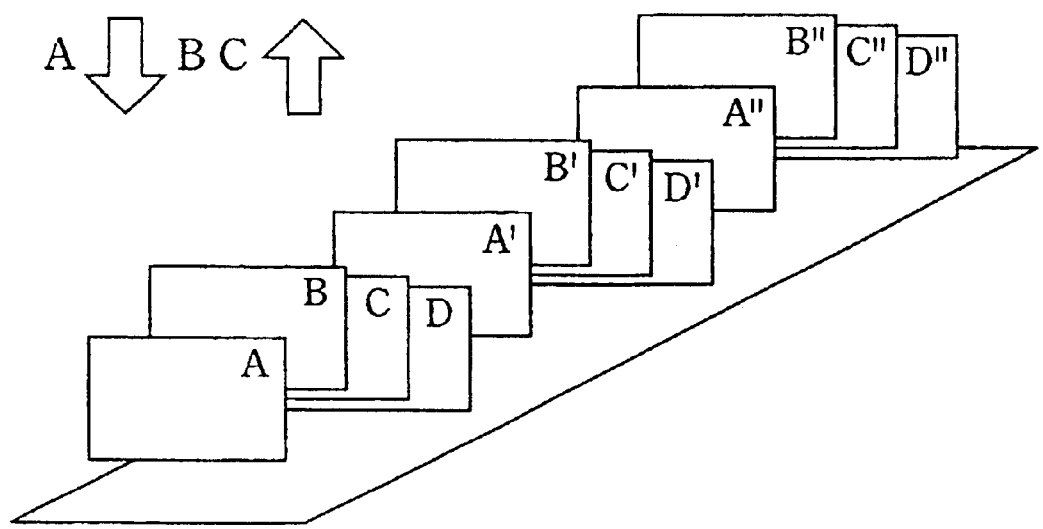
FIG. 13 illustrates another frame in an example of the control of spectator behavior.
Figure 14:
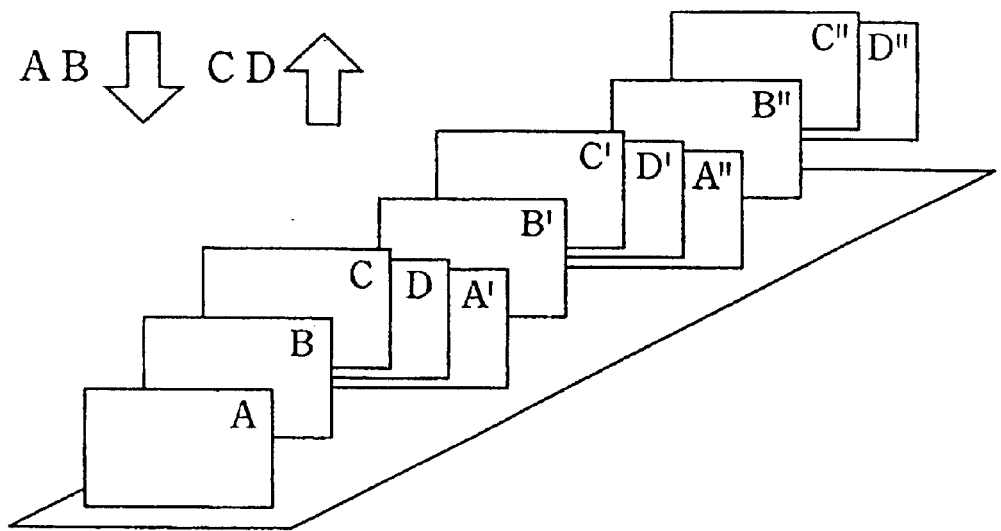
FIG. 14 illustrates another frame in an example of the control of spectator behavior.
Figure 15:
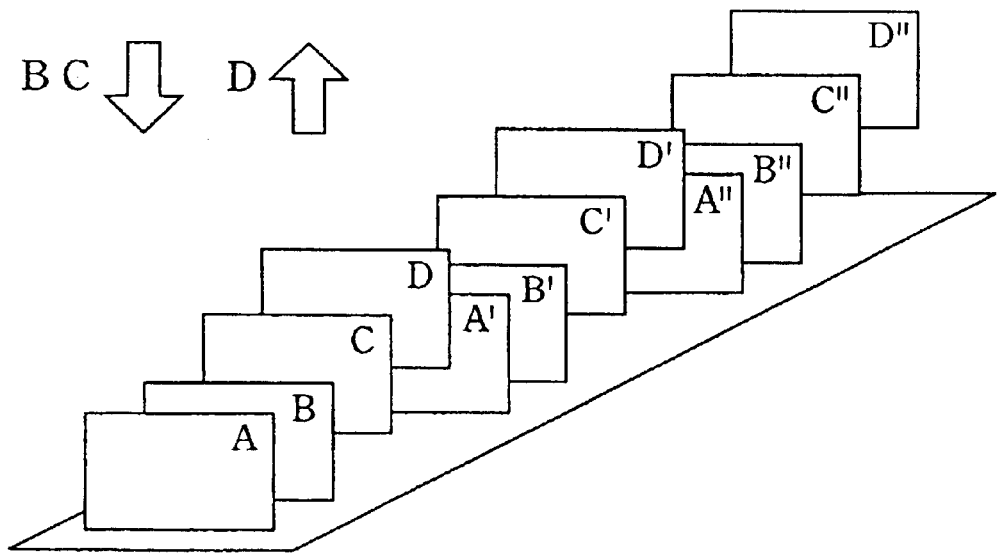
FIG. 15 illustrates another frame in an example of the control of spectator behavior.
Figure 16:
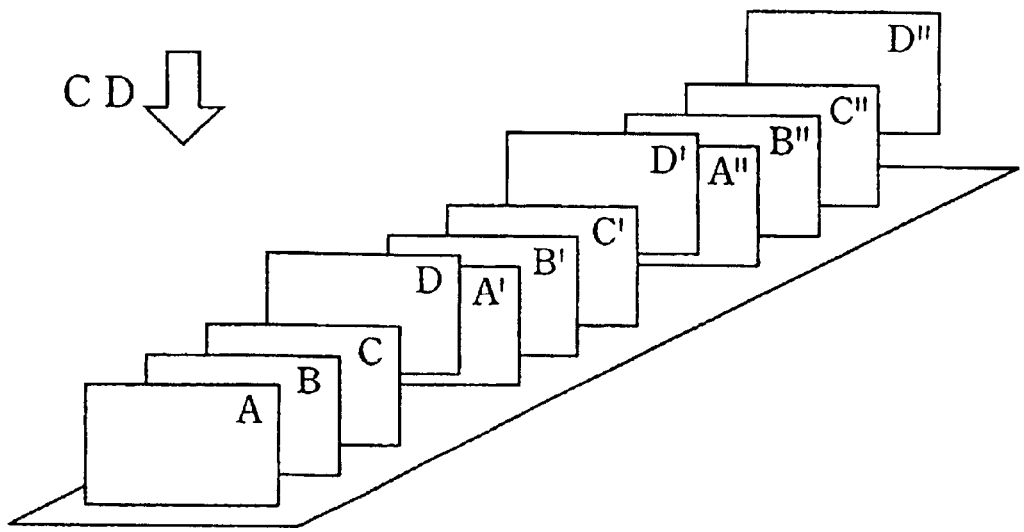
FIG. 16 illustrates another frame in an example of the control of spectator behavior.
Figure 17:
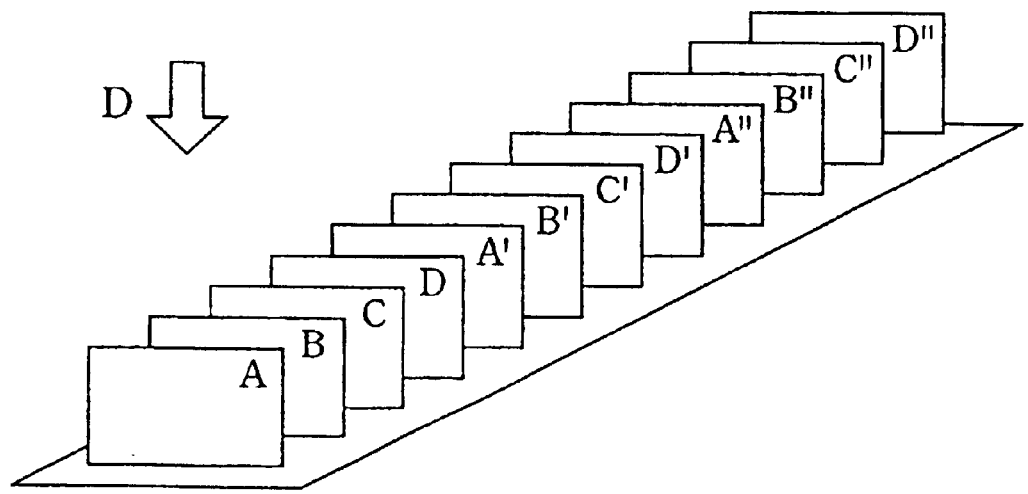
FIG. 17 illustrates another frame in an example of the control of spectator behavior.

Specifically, in the first new frame shown in FIG. 11, The first fifth, and ninth polygons A, A', and A" from the front constituting the first object OB1 are raised up in virtual space (up). In the next new frame shown in FIG. 12, the three polygons A, A', and A" of object OB1 are raised further up (up), and the second, sixth, and tenth polygons B, B', and B" constituting the second object OB2 are raised up (up). In the next new frame depicted in FIG. 13, the polygons A, A', and A" of the object OB1 drop down in virtual space (down), the polygons B, B', and B" of the second object OB2 are raised further up, and the third, seventh, and eleventh polygons C, C', and C" constituting the third object OB3 are raised up (up). In the next new frame depicted in FIG. 14, the polygons B, B', and B" of the second object OB2 and the polygons C, C', and C" of the third object OB3 drop down (down), and the three polygons D, D', and D" of object OB4 are raised up (up). In the next new frame depicted in FIG. 15, the polygons c, C', and C" of the third object OB3 and the polygons D, D', and D" of object OB4 drop down (down). In the next new frame, the polygons D, D', and D" of object OB4 which drops down more slowly drops further down (down). Thus, as shown in FIG. 17, the sequence returns to the initial state of the polygon positions. The polygons may similarly be moved side to side.

The spectator data of the portion seen from the virtual camera is designated by the CPU 1 to the VDP 5 each time one or more groups of polygons are moved (from the state in FIG. 10 to that in FIG. 11, for example) (S44). The process subsequently returns to the process in step S41, repeating the aforementioned behavior pattern control process for each new frame. This process for controlling the behavior of the spectators can be executed for groups of display frames instead of frame-by-frame to simplify the process. The process for controlling spectator behavior may also be executed during certain modes (such as during goals). The display objects in three-dimensional virtual space are displayed with changing perspective, relative to the display screen, from a certain point of view of the virtual camera in virtual space (which can be moved by the individual playing the game device). Just to be sure, the point of view in the control of a character's eye direction and the point of view corresponding to the projected center and the position of the virtual camera should be separate.

As a result, a plurality of polygons are connected as a single object, the polygons in a plurality of groups are interleaved in cross-sectional groupings, and each group is textured with connecting patterns, so that the diverse behavior of constantly moving spectators can be more realistically portrayed simply by moving the polygons in their object units. Because they move in object units, software design can be simplified with fewer commands, for example.

The behavioral control itself is simple, resulting in lower computing loads for such control. The control can be done with far less data to handle, while displaying behavior far more realistic than when spectators are individually portrayed with polygons. As such, less memory capacity is needed to store the spectator data. Of course, spectator behavior can be displayed more realistically and immediately with less data than when such behavior is displayed by animation.

The process for fog control mentioned above is described below with reference to FIGS. 18 through 21. This fog control is a process in which one type of mask data having color values, as described above, is superposed on image data. This affords a more realistic image display which cannot be obtained by just reflecting on the screen the changes in brightness accompanying changes in sunlight throughout the day using only conventional luminance data.

Figure 18:
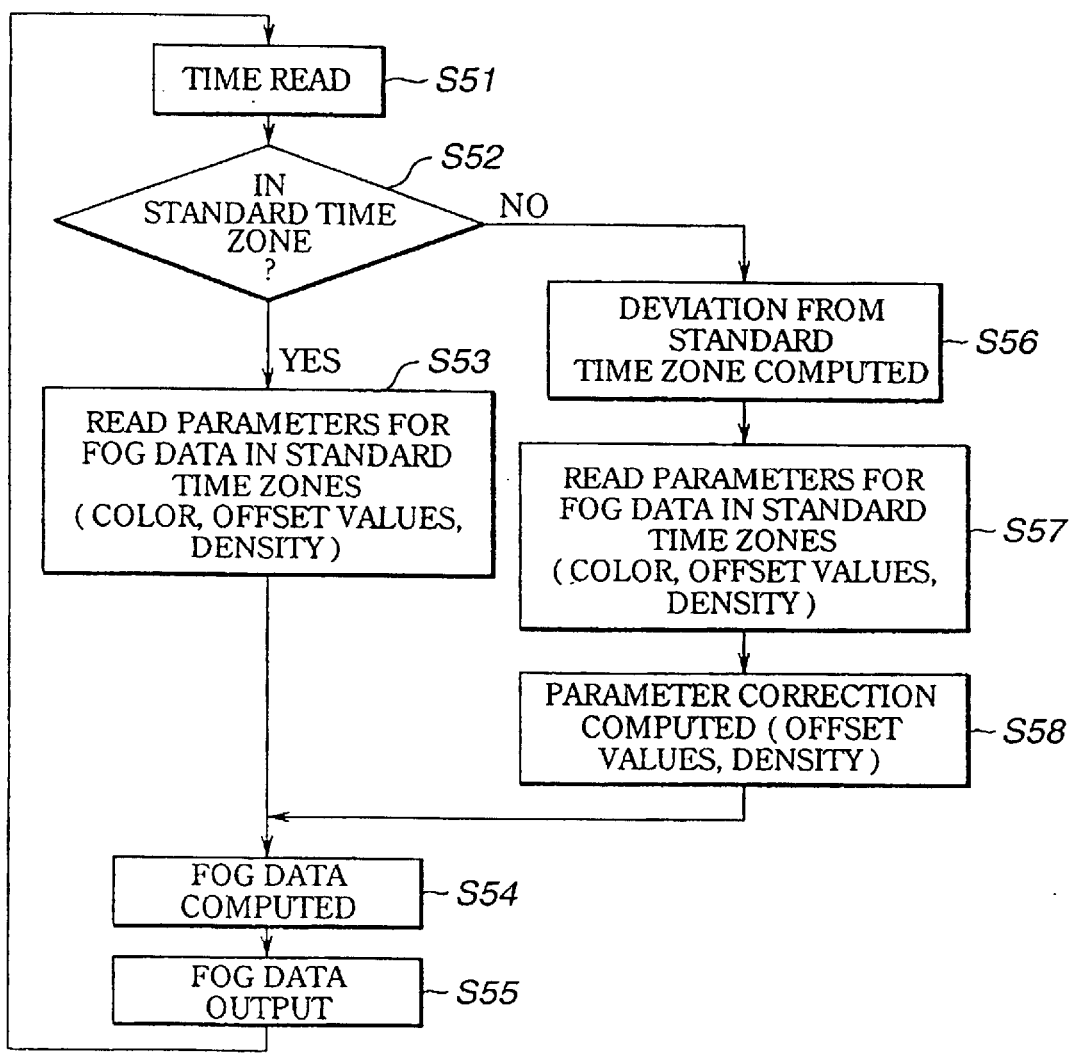
FIG. 18 is a schematic flow chart relating to an example of fog control.

This process is executed by the CPU 1 as shown in FIG. 18, for example. The process in FIG. 18 may also be executed by the VDP 5.

Figures 19, 20:
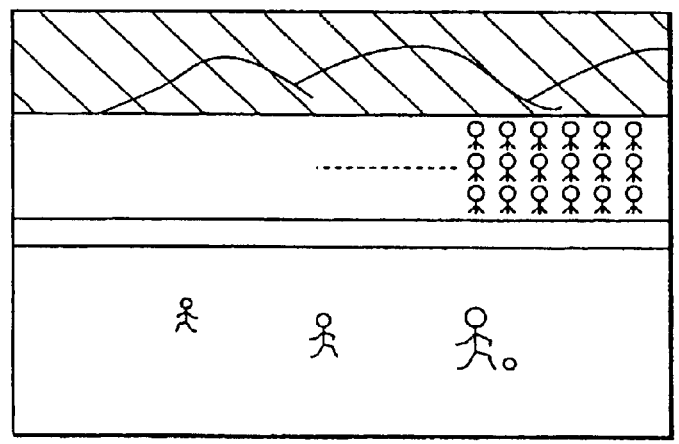
FIG. 19 illustrates time zone division for fog control.
FIG. 20 illustrates an example of a display screen based on fog control.
Figure 21:
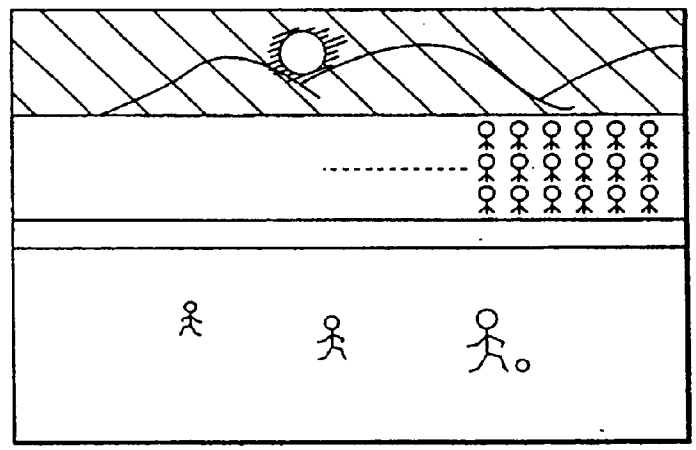
FIG. 21 illustrates another example of a display screen based on fog control.

The CPU 1 first reads the current time, that is, the standard time in which a player (individual playing the game device) is playing the game device, from the real time clock 13 (S51). It is then determined whether or not the time deviates from the predetermined time zone serving as reference for daytime, evening, or night (S52). The standard time zones for daytime, evening, and night are determined as shown in FIG. 19, for example. For example, the daytime standard time zone is established at a relatively long 6:00 to 16:30, the evening time zone is established at 17:00 to 18:30, and the night standard time zone is established at 19:30 to 5:30. The daytime standard time zone is longer because to avoid differences in game results due to changes in screen brightness between players playing in the morning and players playing in the evening.

When YES in step S52, the predetermined fog data parameters for the daytime, evening, and night standard time zones are read from ROM 2 (S53). The three parameters are red, blue, and green fog color codes, offset values (indicating fog depth), and density (degree to which fog is applied relative to depth), and these parameters are predetermined so as to be suited to the standard time zones.

The CPU 1 then computes the fog data, and outputs the data in the form of mask data to the VDP 5 (S54, S55).

If NO in step S52, the deviation between the current time and the standard time zones is calculated (S56). For example, when the time is 5:45 in the morning, the deviation is 15 minutes exactly midway between the night standard reference time zone and that for daytime.

The CPU 1 then reads the fog data parameters (R, G, B color codes, offset values, density) for the two standard time zones between which the deviant time falls (S57). When the time is 5:45, for example, the parameters for the night and daytime standard time zones are read.

The offset and density parameter values are corrected (S58). For example, when the time is 5:45, the offset values and density are the mean values for ½ of the offset and density values of the night and daytime standard time zones. When the time is closer to one of the standard time zones, the values are averaged (corrected), with the values of the closer time zone given more importance.

The offset values and density are determined by such correction when the time thus deviates from the standard time zone, and the fog data is computed and output in the same manner as above (S54, S55).

This results in the real time display images which have been fogged according to the state of sunlight assumed for the time during which the game is being played by a player (individual playing the game device). For example, when a game is played in the evening, the background beyond the playing field has darkish fogging (see the slanted lines in FIG. 20). When a game is played at night, for example, the background has darkish fogging and yellowish fogging from the shine of moon light, assuming the moon is out in the back ground (see slanted lines in FIG. 21).

It is thus possible to more realistically represent spectral changes and the brightness of the light source, unlike cases in which the state of the sunlight (physical brightness) in the images portraying the playing field and its environment is displayed merely through the control of the luminance as in the past. In particular, local brightness such as in portions where the moon is out, for example, can be easier to control because of the coverage of the color fog data. In the present embodiment, the subtle brightness of standard time zones such as when the rising or setting sun is out can be processed based on the corrected parameters obtained using two standard time zones among those for daytime, evening, and night.

That is, the color state is determined by preparing in advance the color state corresponding to suitable color states for a daytime, evening, or night game, and by making corrections (specifically, processes for mixing color; luminance values corrected on the basis of two sets of standard values may also be added) based on standard values between daytime and evening, evening and night, or night and daytime for color states suited to the time in which the game is played. It is thus no longer difficult to play the game as the screen darkens, which is what happens when adjustments are made using only luminance values. The point at which color adjustment begins (one standard value) and the point at which it ends (another standard value) are predetermined, and the states which are suitable for games are set, so no advantages or disadvantages are produced by the color state of the screen, no matter what time in which the game is played. That is, because of the very nature of the game, it is important that "no sense of unfairness is experienced as a result of advantages or disadvantages caused by the time zone in which the game is played" when "color changes based on time changes" are presented, and the device in the present embodiment is able to deal with this. It is thus possible to provide images with better immediacy in portraying the brightness of the environment in which the playing field and its surroundings are enveloped.

The aforementioned control of character's eye direction, control of spectator behavior, and fog control need not necessarily be managed simultaneously. Any one or two may be controlled.

A second embodiment of the present invention is described below with reference to FIGS. 23 through 58.

Figure 23:
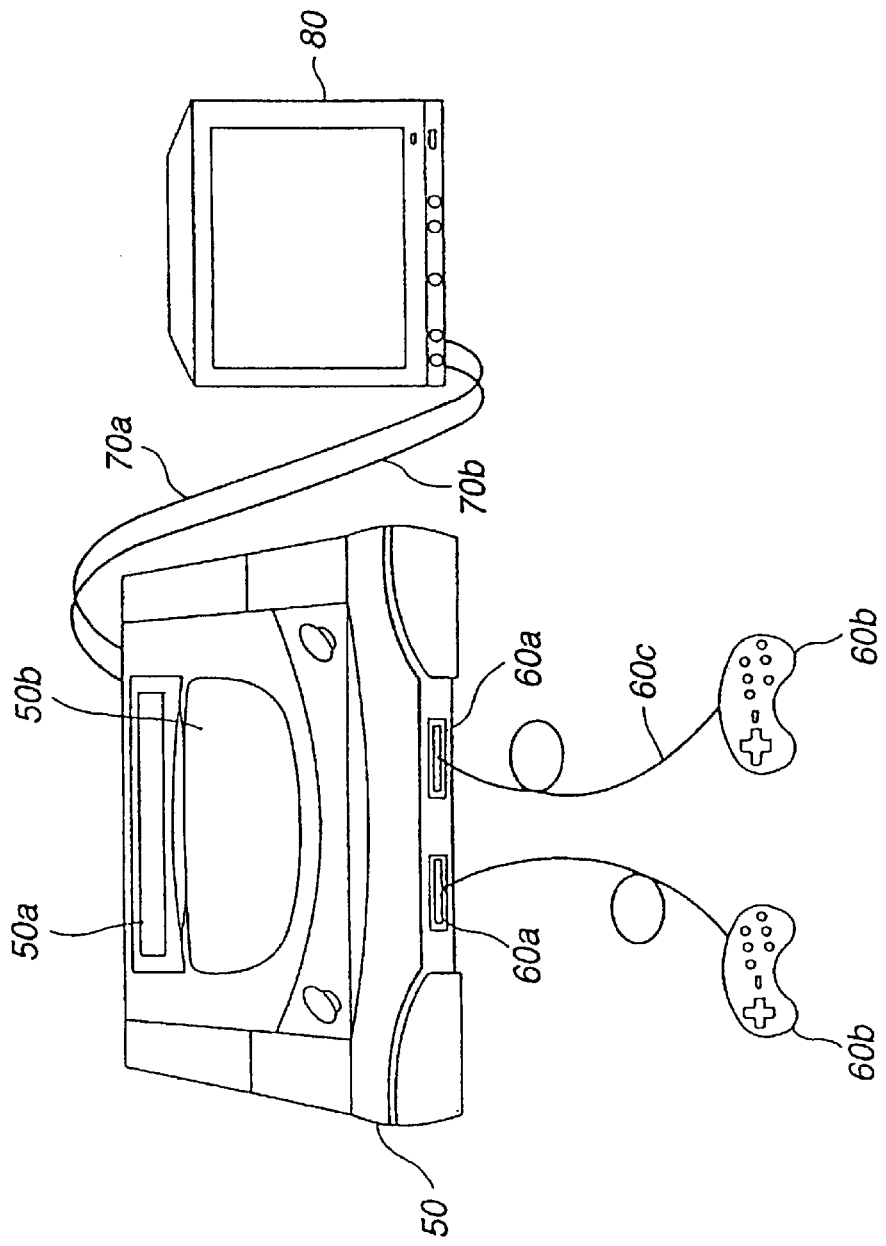
FIG. 23 illustrates an example of the overall structure of a game device.

FIG. 23 illustrates the appearance of a video game machine featuring the use of an image processing device relating to another embodiment of the present invention. In the figure, the video game machine main unit 50 is roughly in the shape of a box, with boards and the like for processing the game installed in the interior. Two connectors 60a are provided on the font surface of the video game machine main unit 50, and game playing PADs 60b are connected by cables 60c to the connectors 60a. When two players play the game, both PADs 60b are used.

A cartridge I/F 50a for connecting ROM cartridges and a CD-ROM drive 50b for reading CD-ROM are provided on the top of the vide game machine main unit 50. Although not shown in the figure, video output terminals and audio output terminals are provided in the back of the video game machine main unit 50. The video output terminals are connected by a cable 70a to the video input terminals of a TV receiver 80, and the audio output terminals are connected by a cable 70b to the audio input terminals of th TV receiver 80. Users operate the PAD 60b in such video game machines to play the game while watching images projected on the TV receiver 80.

Figure 24:
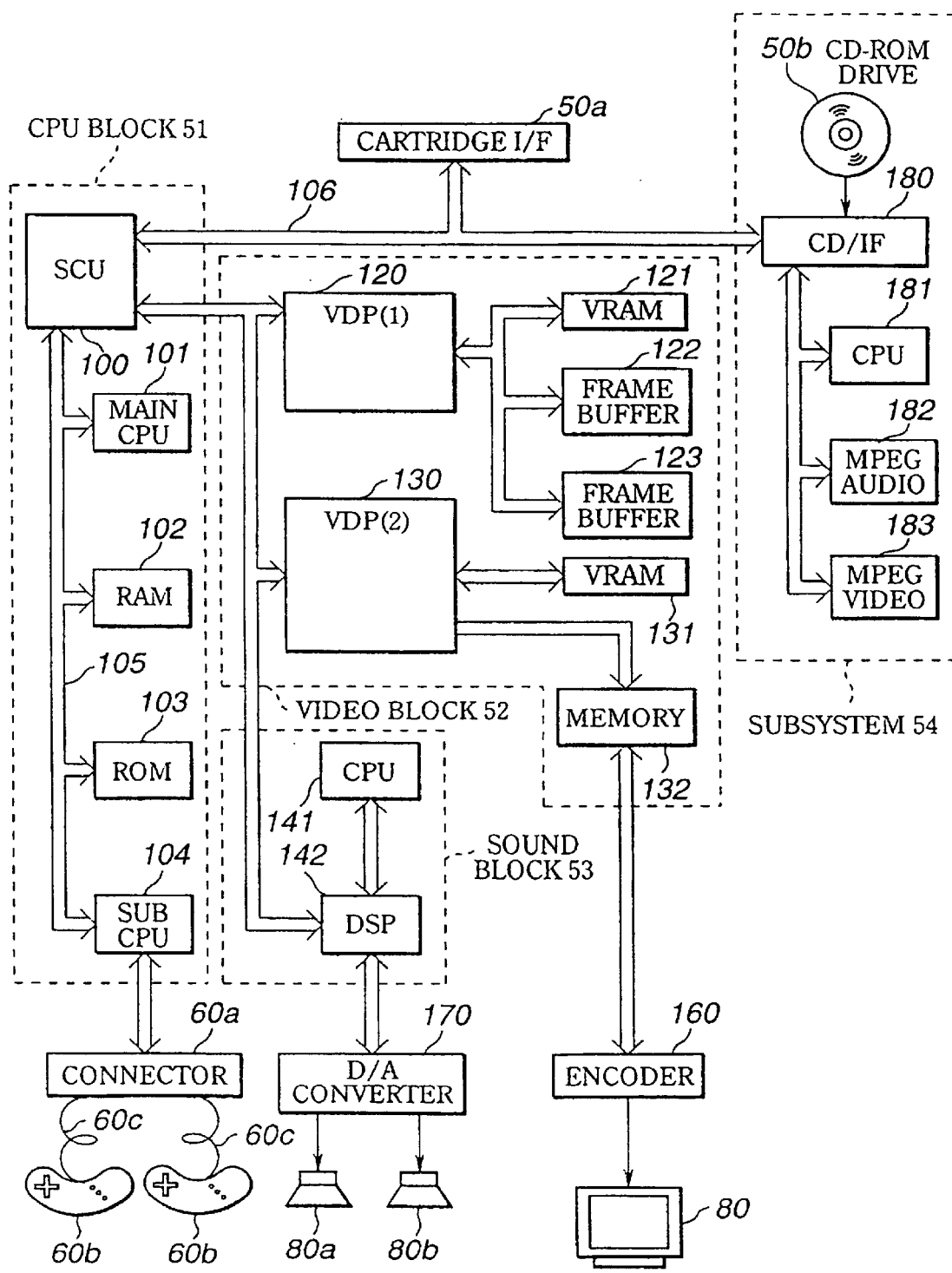
FIG. 24 is a block diagram illustrating the circuit structure of the game device.

FIG. 24 is a block diagram showing a schematic of the TB game machine in the present embodiment. The image processing device is composed of a CPU block 51 for controlling the entire system, a video block 52 for controlling the game screen display, a sound block 53 for generating sound effects and the like, a subs system 54 for reading the CD-ROM, and the like.

The CPU block 51 is composed of an SCU (system control unit) 100, a main CPU 101, an RAM 102, and ROM 103, a cartridge I/F 50a, a subCPU 104, a CPU bus 103, and the like. The main CPU 101 controls the entire system. The main CPU 101 has computing functions similar to that of an internal DSP (digital signal processor), allowing application software to be rapidly executed. The RAM 102 is used as a work area for the main CPU 101. An initial program or the like for initialization is written to the ROM 103. The SCU 100 controls buses 105, 106, and 107 so as to ensure smooth data input and output between the main CPU 101, VDP 120 and 130, DSP 140, CPU 141, and the like. The SCU 100 has a DMA controller installed in the interior, allowing sprite data in the game to be transmitted to the VRAM in the video block 52. Application software for games and the like can thus be rapidly executed. The cartridge 50a is used to input application software provided in the form of an ROM cartridge.

The subCPU 104 is referred to as a SMPC (system manager and peripheral control), and has the function of collecting peripheral data from the PADs 60b through the connectors 60a in response to commands from the main CPU 101. The main CPU 101 executes processes based on peripheral data received from the CPU 104. Any peripheral from among PADs, joysticks, keyboards, and the like can be connected to the connectors 60a. The subCPU 104 has the functions of automatically recognizing the type of peripheral connected to the connectors 60a (main unit side terminals), and of collecting peripheral data according to the transmission mode corresponding to the type of peripheral.

The video block 52 is equipped with a VDP (video display processor) 120 for imaging characters and the like consisting of video game polygon data, and a VDP 130 for imaging background screens, synthesizing polygon image data and background images, clipping processing, and the like. The VDP 120 is connected to the VRAM 121, and frame buffers 122 and 123. The imaging data for the polygons representing the video game machine characters are sent from the main CPU 101 through the SCU 100 to the VDP 120, and are written to the VRAM 121. The imaging data written to the VRAM 121 is imaged by the imaging frame buffer 122 or 123 in the form of 16- or 8-bit/pixels, for example. The imaged data in the frame buffer 122 or 123 is sent to the VDP 130. Data controlling the imaging is sent from the main CPU 101 through the SCU 100 to the VDP 120. The VDP 120 executes the imaging process accordingly.

The VDP 130 is connected to the VRAM 131, and image data output from the VDP 130 is output to an encoder 160 through memory 132. The encoder 160 generates image signals by adding synchronizing signals or the like to the image data, and outputs them to the TV receiver 80. The game screen is thus displayed on the TV receiver 80.

The sound block 53 is composed of a DSP 140 for synthesizing sounds according to either PCM mode or FM mode, and a CPU 141 for controlling the DSP 140. The audio data synthesized by the DSP 140 is converted to 2 channel signals by a D/A convertor 170, and is then output to speakers 80b.

The subsystem 54 is composed of a CD-ROM driver 50b, CD I/F 180, CPU 181, MPEG Audio 182, MPEG Video 183, and the like. The subsystem 54 has the function of reading application software provided in the form of CD-ROM, and of reproducing animation. The CD-ROM drive 50b reads data from the CD-ROM. The CPU 181 executes processes such as control of the CD-ROM drive 50b and correcting errors in the data that is read. The data read from the CD-ROM is fed through the CD I/F 180, bus 106, and SCU 100 to the CPU 101, where it is used as application software. The MPEG Audio 182 and MPEG Video 183 are devices for restoring data which has been compressed according to MPEG standards (motion picture expert group). Animation can be reproduced by using the MPEG audio 182 and MPEG video 183 to restore the MPEG compressed data written to CD-ROM.

Figure 25:
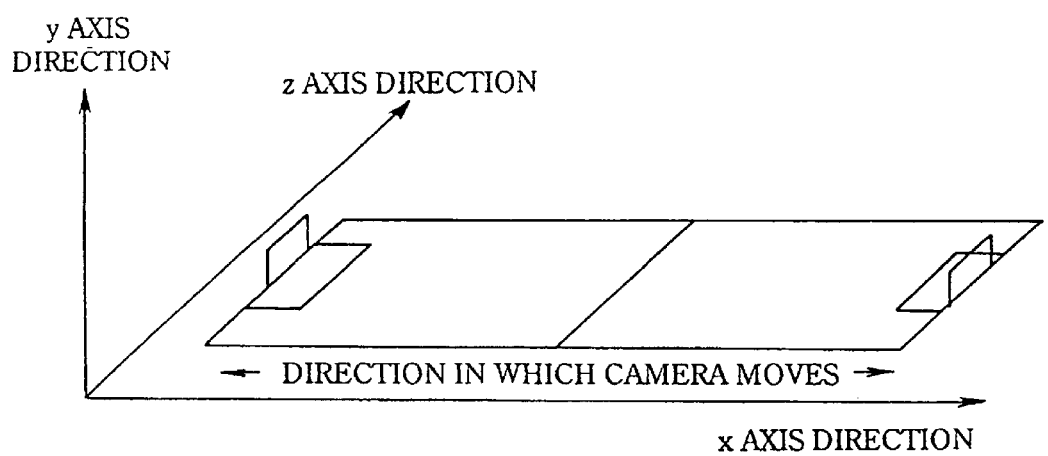
FIG. 25 illustrates the virtual game space formed by the game device.

FIG. 25 illustrates a case of a soccer game being played, as an example of a game, in 3D virtual game space formed by a computer system.

In the figure, a soccer court is formed on the x-z a plane in 3D virtual space. The lengthwise direction (left-right direction) of the court is in the direction of the x axis, the breadthwise direction (depthwise direction) of the court is in the direction of the y axis, and the heightwise direction is in the direction of the z axis. Various athlete objects not shown in the figure are situated on the court, and the game device players control the movements of the character athletes by means of input devices. Line objects are described on the ground to form the soccer court. The game is relayed by a virtual camera (point of view) which is situated to display circumstances in the visual field in virtual game space by means of coordinate conversion or the like on a two-dimensional monitor screen.

Figure 26:
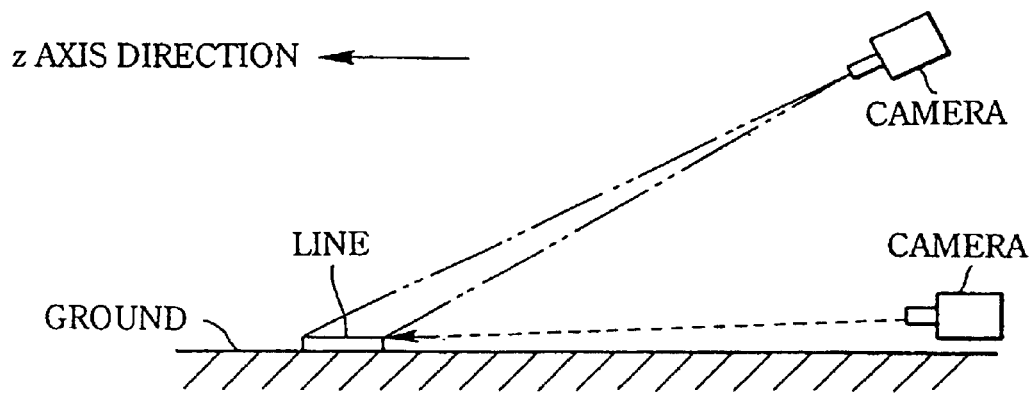
FIG. 26 illustrates the perspective of a line drawn between the camera position and the ground.
Figure 27:
FIG. 27 illustrates a process in which the vertices on the inside edge of line polygons are elevated to make the line visible.

FIGS. 26 and 27 illustrate perspectives in the present invention. In FIG. 26, line objects are arranged by a combination of polygons (hereinafter referred to as line polygons) forming lines on the ground, and a soccer court drawn by the lines is formed, as shown in FIG. 25. The lines are well displayed on the screen when the camera position in game space is at an angle overlooking the field from above, but the surface area of the lines in the screen diminishes as the vertical (y axis) angle of the camera approaches the horizontal direction, and the lines gradually disappear from the monitor screen. Additionally, in cases where the line polygons and camera face each other, that is, when the line polygon normal line vector and the camera's eye direction vector are parallel, it is sometimes possible for the line polygons to become so fine that they cannot be displayed on two-dimensional projection screens in which three-dimensional virtual space has undergone coordinate conversion when the point of view is sufficiently remote. This is disadvantageous in games which are played inside such lines (or a court).

Thus, in the present invention, the positional coordinates of some of the vertices of line polygons are modified to increase the surface area projected by the camera under conditions which make it difficult for lines to be projected on the monitor screen. That is, That is, in the reciprocal relation with the camera, the surface area of line polygons projected by the camera is increased by slightly elevating, as shown in FIG. 27, the height position of vertices located in the depthwise direction, as viewed from the camera, of the line polygons situated on the ground.

Figure 28:
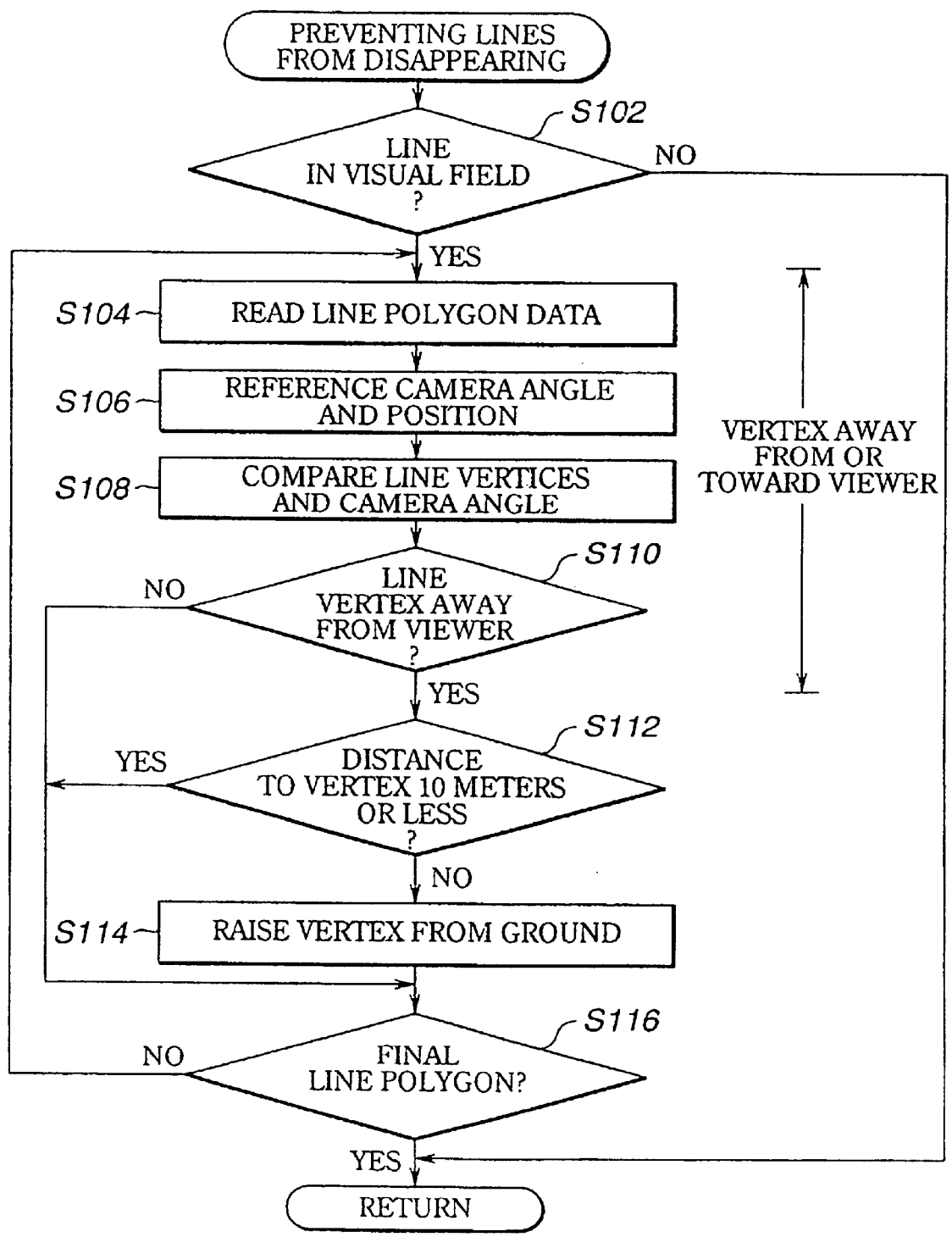
FIG. 28 is a flow chart illustrating the process for preventing the lines from disappearing.

FIG. 28 is a flow chart illustrating the algorithm for such a process.

First, when line polygons (or line objects) are present in the visual field of the camera viewing objects situated in virtual game space, a corresponding flag is established by the program not shown in the figure. When this is determined in the main program (not shown in figure), a process for preventing the lines from disappearing is executed (S102, YES).

Figure 29:
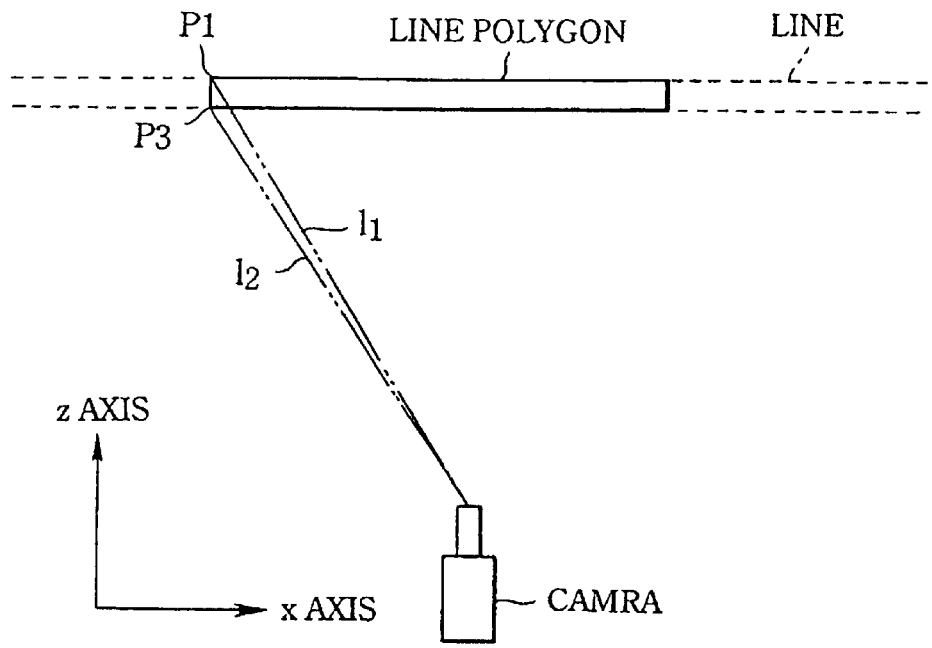
FIG. 29 illustrates the positional relation between the camera and the vertices of the line polygons.

It is first determined whether the vertices of the line polygons are located away from or toward the camera. A method for this, as shown in FIG. 29, is to calculate the distance 11 between the camera and vertex P1 and distance 12 between the camera and vertex P3, and to determine the further and nearer vertices based on the magnitude of the two distances.

Figure 30:
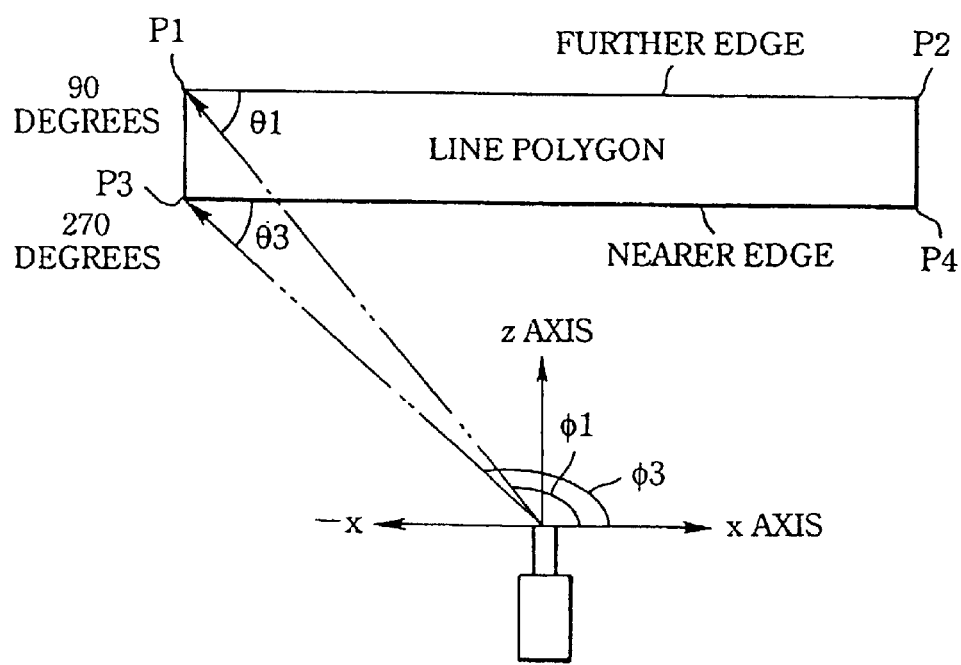
FIG. 30 illustrates the positional relation between the camera and the vertices of the line polygons.

Another method, as shown in FIG. 30, is to compare the angles θ1 and θ3 of the vertices P1 and P3 and the angles Ø1 and Ø3 of the camera to determine the further and nearer vertices P1 and P3. Although either of these two methods can be used in the present embodiment, the latter is more advantageous because there are fewer calculations for the hardware than in the former method.

The latter method for comparing angles is used to describe the determination of the further and nearer vertices of the line polygons in steps S104 through S110 below.

Figure 31:
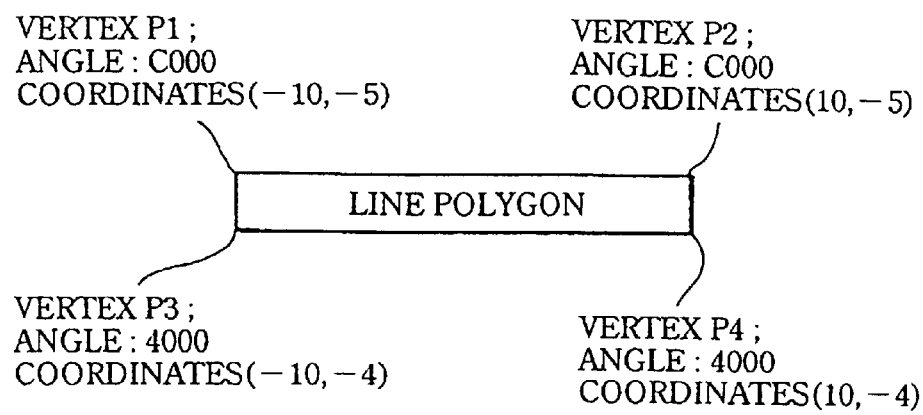
FIG. 31 illustrates an example of the data for the vertices of the line polygons.

The data of a line polygon is read from an object table not shown in the figure which gives the object groups situated in the scene (S104). FIG. 31 is of an example of line polygon data, where, for example, coordinate values $(x_n, z_n)$ of a world coordinate system as well as predetermined angles and the like for determining further and nearer vertices are correlated in the data for polygon vertices P1 through P4.

As shown in FIG. 30, the current position of the camera in the world coordinate system (x-z plane) and the angle Øn in the vertex Pn direction of a line polygon seen from the camera position are then read. The angle Øn can be determined by a trigonometric function from the coordinates of the line polygon vertex Pn and the coordinates of the camera position (S106).

The line polygon vertex and camera angle are then compared (S108). In FIG. 30, for example, the predetermined angle for vertex P1 is 90 degrees, and the predetermined angle for vertex P3 is 270 degrees. When the angle Ø1 from the x axis of the eye direction vector between the camera and vertex P1 is 120 degrees, then 120 degrees–90 degrees=30 degrees<90 degrees (where 90 degrees is the reference value for determination in this case) (S108), allowing it to be determined as the vertex on the depthwise edge of the polygon (S110).

When the angle Ø3 from the x axis of the eye direction vector between the camera and vertex P3 is 150 degrees, then 150 degrees–270 degrees=ABS (120 degrees)>90 degrees (where 90 degrees is the reference value for determination in this case, and ABS is the absolute value) (S108), allowing it to be determined as the vertex on the nearer edge of the line (S110).

When the vertex Pn is the nearer edge of a line object, no height adjustment is carried out for vertex Pn, and the data for the next line polygon vertex is read (S110, NO).

When the vertex Pn is the nearer edge of a line object (S110, YES), it is determined whether or not the distance to vertex Pn is 10 m or less. If 10 m or less (S112, YES), that is, when the camera is near the line, the line is normally visible on the screen, so the height of the vertex Pn is not adjusted, and the data for the next line polygon vertex is read (S112, NO).

When the distance to the vertex Pn is more than 10 m (S112, NO), that is, when the camera is remote from the line, the line is usually difficult to see, so the value in the y axis direction (heightwise direction) in the coordinate data for the vertex Pn on the further edge of the line is increased a certain amount to raise the further edge of the line polygon up from the ground (S114). This process is carried out foe each of the vertices of all the line polygons in the screen (S116).

As a result, the further edges of the line objects situated in virtual game space are raised up, as shown in FIG. 27, allowing them to be easily seen from the camera.

A third embodiment of the present invention is described below. The third invention involves dividing the game field (soccer ground) into prescribed areas, determining the area in which the ball is located, and adjusting the camera angle so that the direction in which the ball is advancing (direction in which the player wants to look) can be readily seen.

FIGS. 32 through 34 illustrate the directions in which game device players move and desirable camera directions when moving in such directions.

First, as shown in FIG. 25, the camera basically moves along the sidelines and is directed in the player direction. Of course, the camera can move into the field to following the game.

Figure 32A:
FIG. 32a illustrates the movement of a player away from and toward the viewer.
Figure 32B:
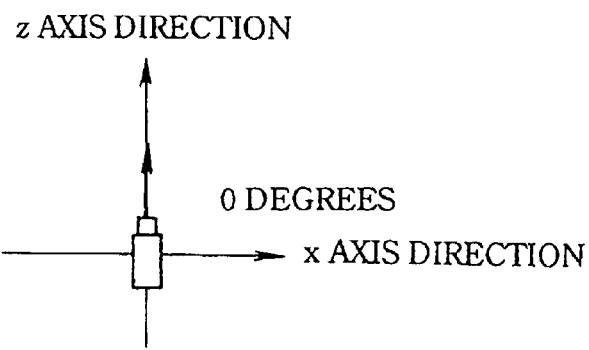
FIG. 32b illustrates the direction of the normal line vector of the camera at this time.

When players controlled by the game device players move in the direction to and away from the viewer (z axis direction) in the x-y plane (FIG. 32a), the camera is directed in the z axis direction (FIG. 32b).

Figure 33A:
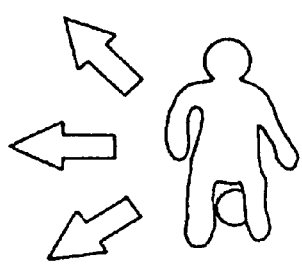
FIG. 33a illustrates the lateral movement of a player.
Figure 33B:
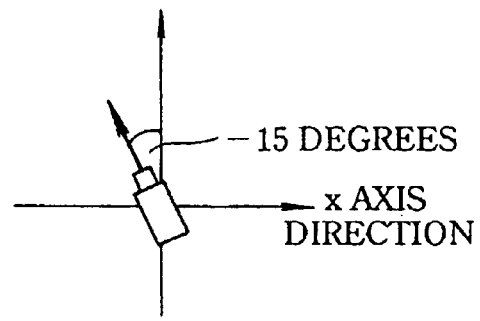
FIG. 33b illustrates the direction of the eye direction vector of the camera at this time.

When the players controlled by the game device players move in the left direction (−x axis direction) in the x-y plane (FIG. 33a), the camera is turned from the z axis direction to a specific angle, such as −15 degrees, to increase the screen display in the area in the direction in which the ball is advancing (FIG. 33b). Here, the angle measured in the clockwise direction (positive direction) from the z axis is a positive value, and angles measured in the counterclockwise direction (negative direction) are negative values.

Figure 34A:
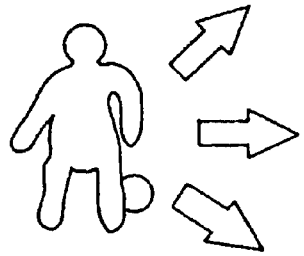
FIG. 34a illustrates the lateral movement of a player.
Figure 34B:
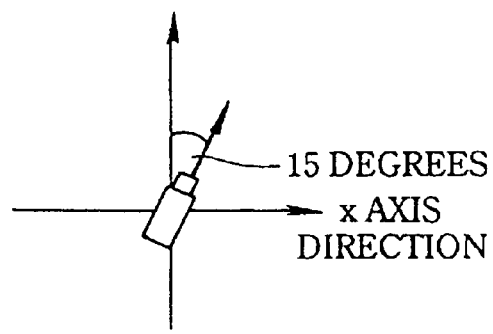
FIG. 34b illustrates the direction of the eye direction vector of the camera at this time.

When players controlled by the game device players move in the right direction (x axis direction) in the x-y plane (FIG. 34a), the camera is turned from the z axis direction to a specific angle, such as 15 degrees, to increase the screen display in the area in the direction in which the ball is advancing (FIG. 34b).

Figure 35:
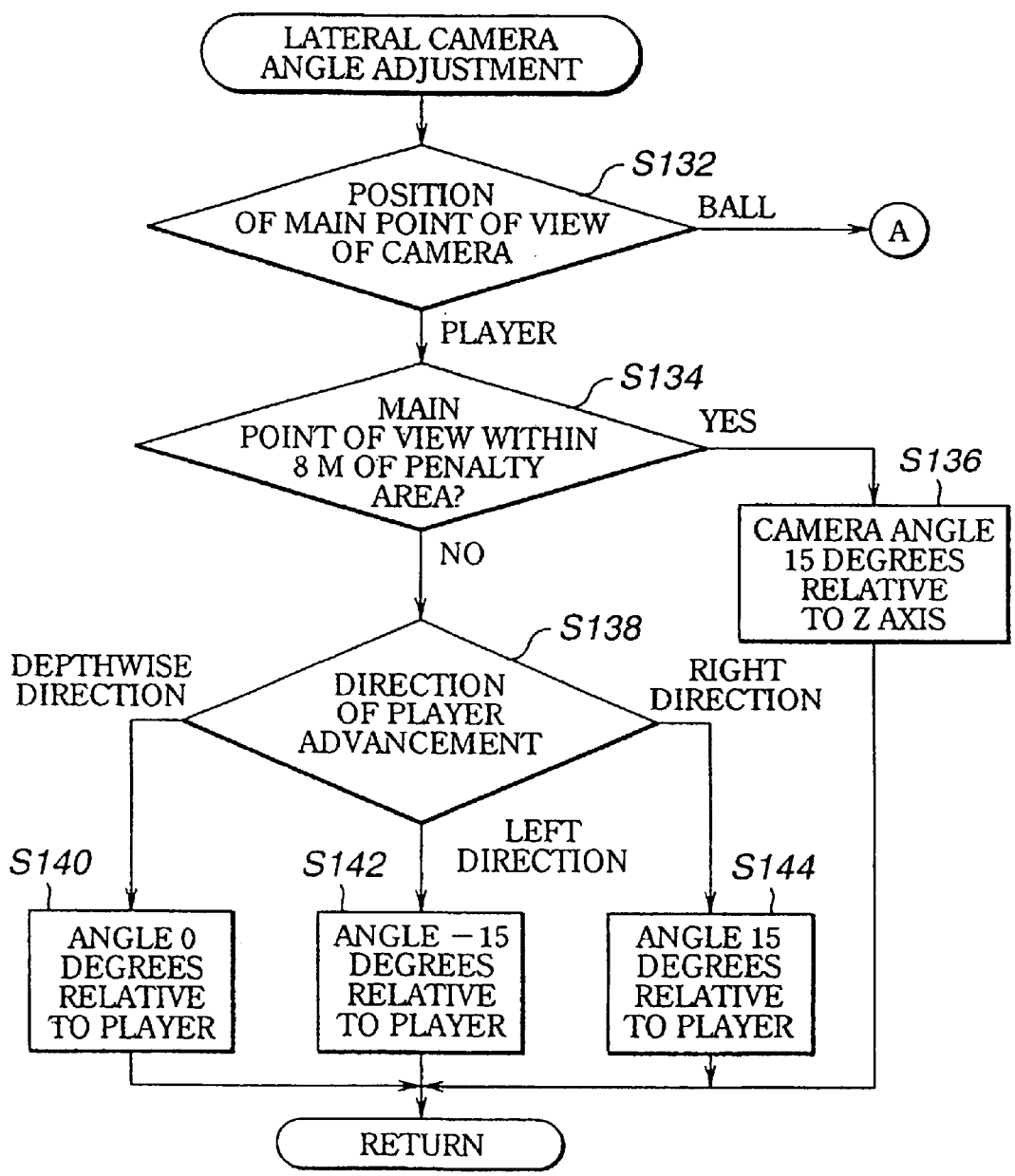
FIG. 35 is a flow chart depicting the process for adjusting the lateral angle of the camera.
Figure 36:
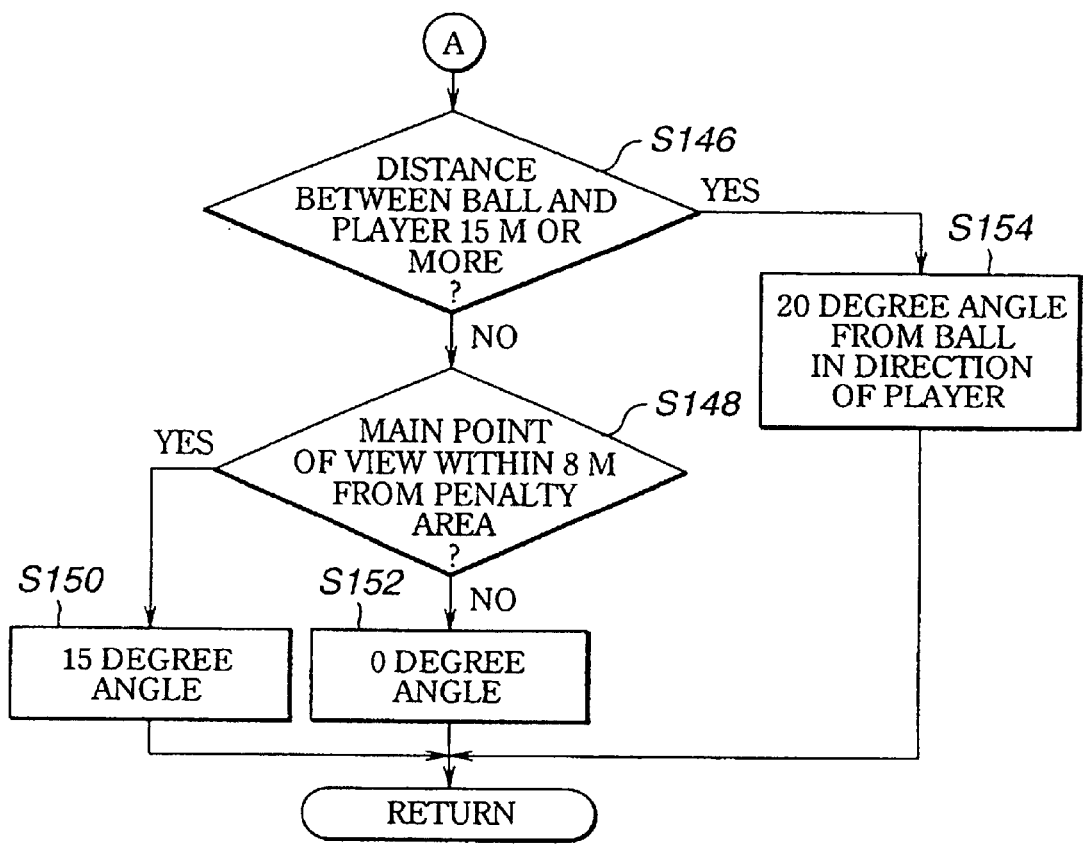
FIG. 36 is a continuation of the flow chart illustrating the process of adjusting the lateral angle of the camera.
Figure 37:
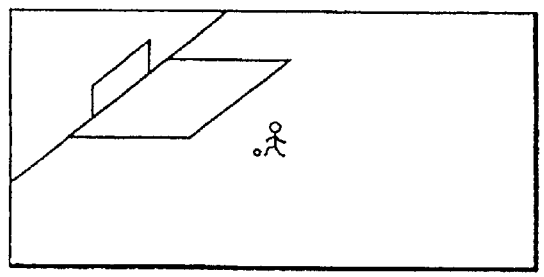
FIG. 37 illustrates a case in which the main point of view of the camera is from a player.
Figure 38:
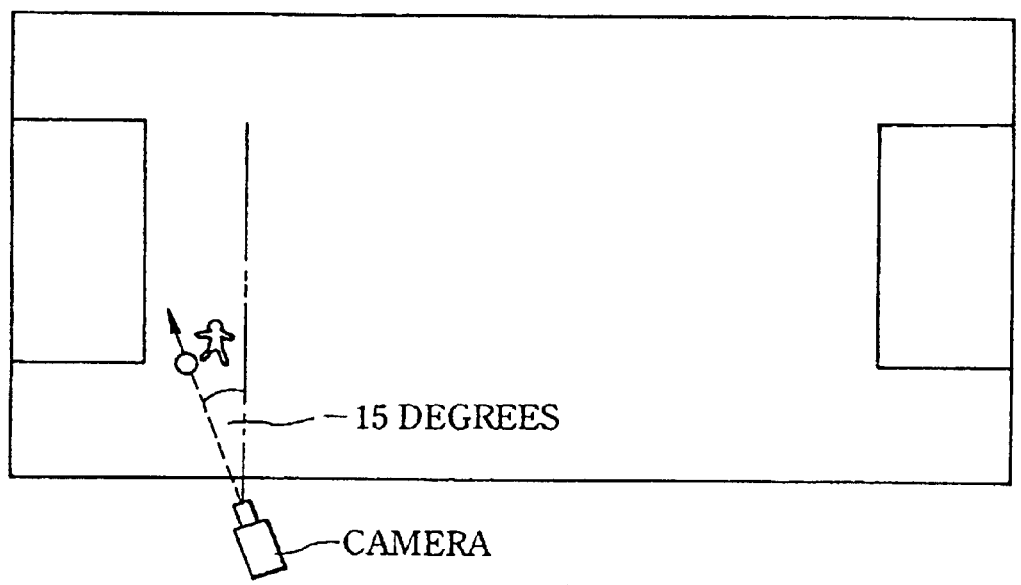
FIG. 38 illustrates and example of the adjustment of the camera angle when the main point of view is within 8 m of a penalty area.
Figure 39:
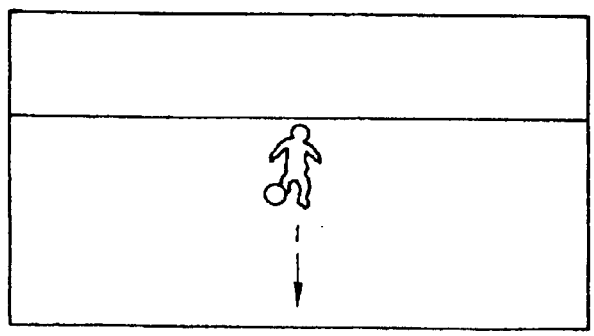
FIG. 39 illustrates a case in which the player's progress is toward the viewer.
Figure 40:
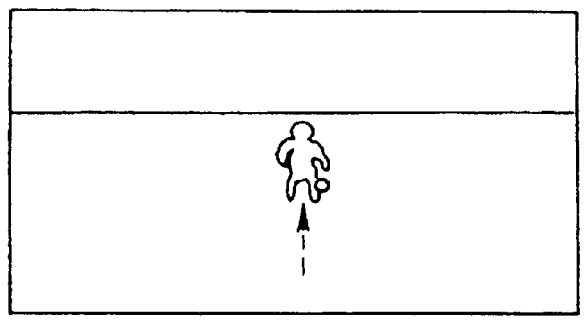
FIG. 40 illustrates a case in which the player's progress is away from the viewer.
Figure 41:
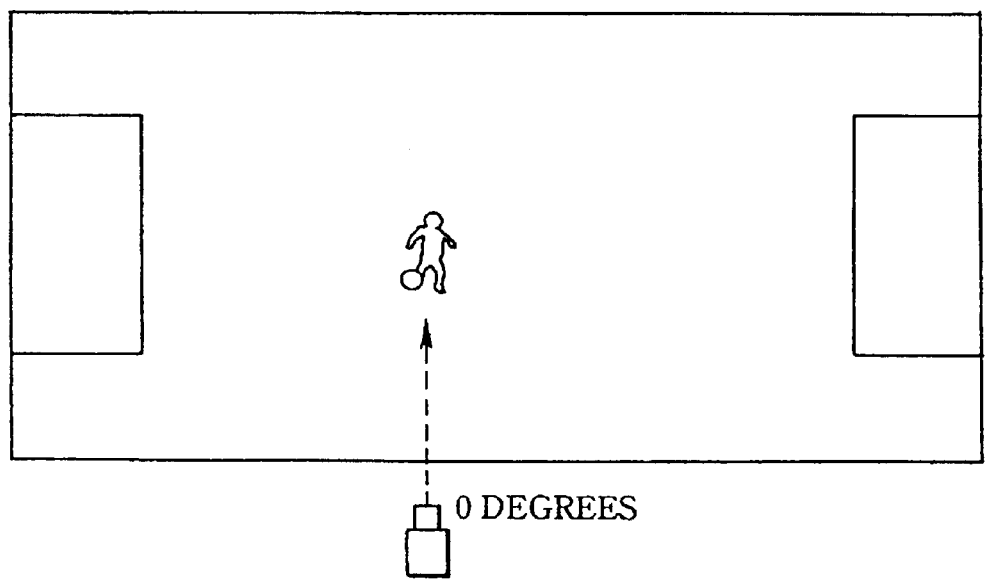
FIGS. 41 illustrates an example of the eye direction vector of the camera when the player's progress is away from and toward the viewer.
Figure 42:
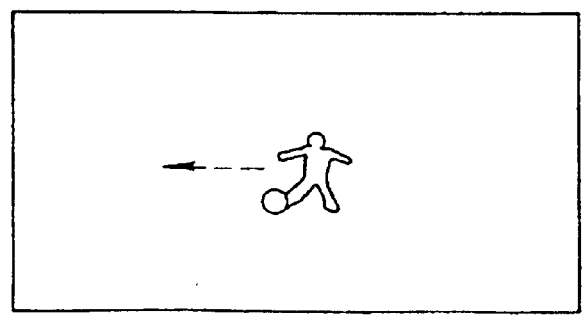
FIG. 42 illustrates an example of a player moving to the left.
Figure 43:
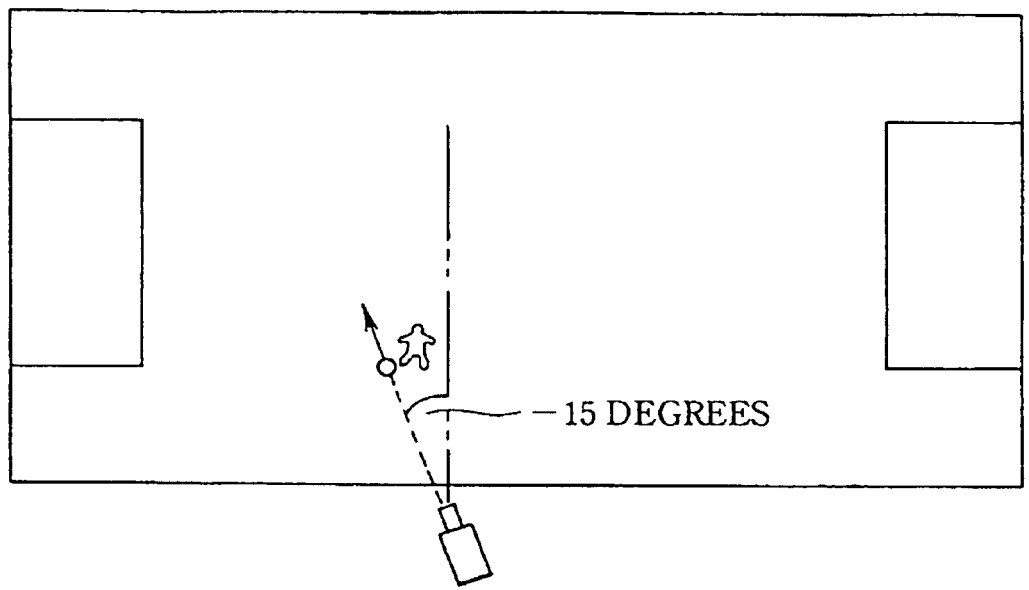
FIG. 43 illustrates the camera angle adjustment when the player moves to the left.
Figure 44:
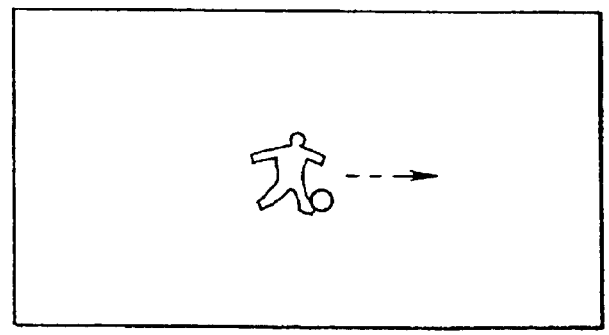
FIG. 44 illustrates an example of the player moving to the right.
Figure 45:
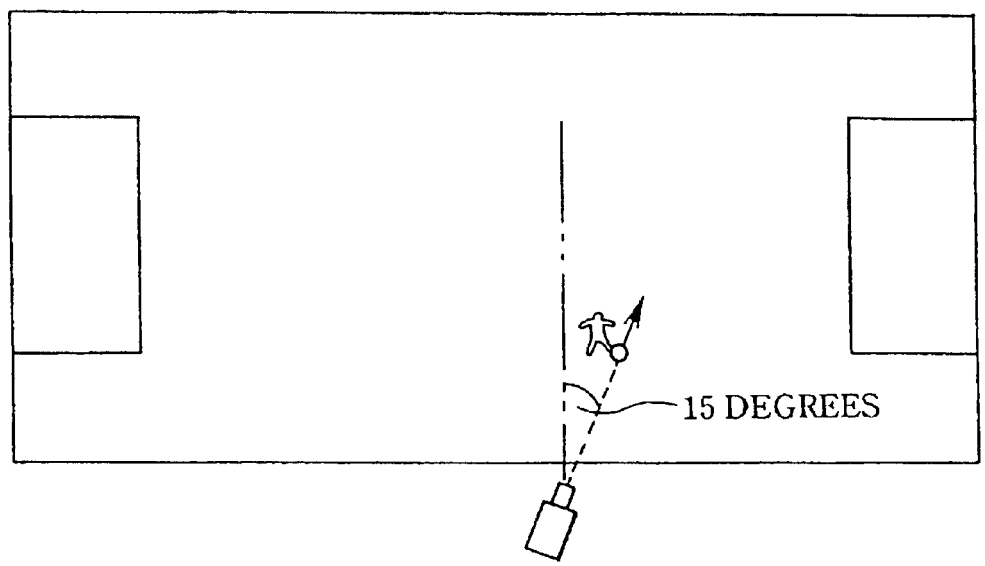
FIG. 45 illustrates the camera angle adjustment when the player moves to the right.
Figure 46:
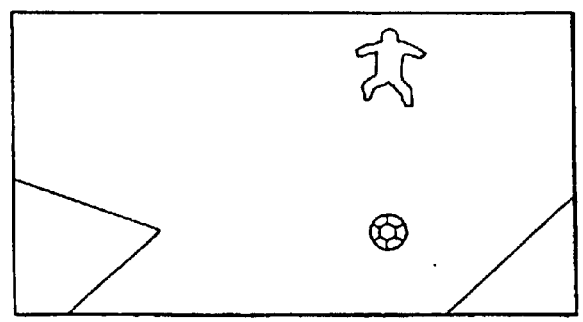
FIG. 46 illustrates an example of when the main point of view of the camera is from the ball.
Figure 47:
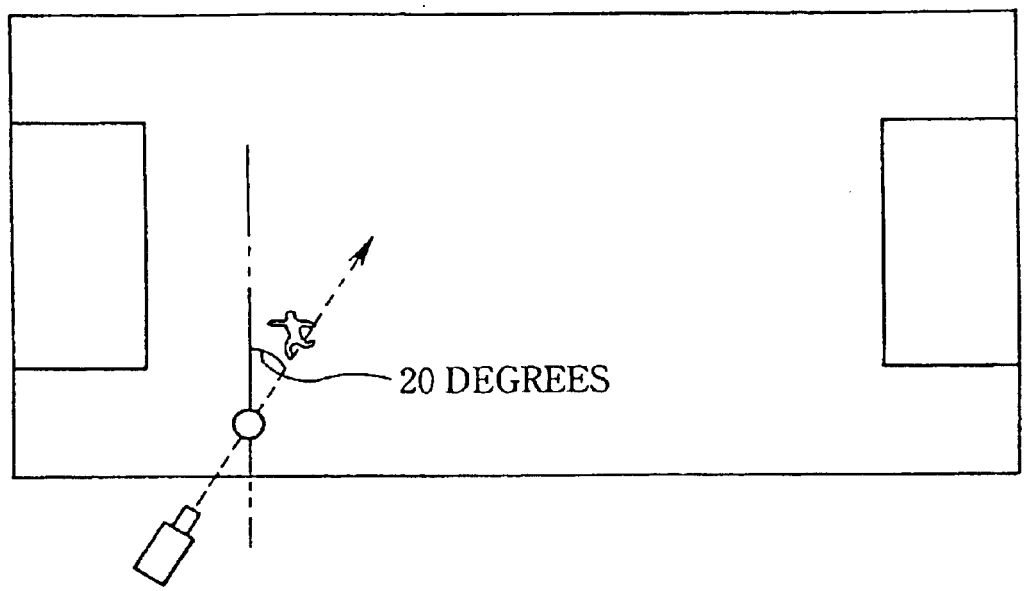
FIG. 47 illustrates an example of the camera angle adjustment when the ball and player are separated by at least 15 m.

An example in which the direction of the camera point of view is determined by combining the camera angle adjustment and the game field area is described with reference to FIGS. 35 and 36.

The main routine for lateral camera angle adjustment is first executed according to prescribed timing (conditions) determined in the main program not shown in the figure, and it is determined whether the main point of view of the camera is on the player side or the ball side (S132).

When it is on the player side (S132, player side), it is determined whether or not the main point of view is a prescribed distance, such as 8 m or less, from the soccer court penalty area (S134). When within 8 m (S134, YES), opponents and fellow team mates gather in the vicinity of the penalty area, with a greater opportunity to pass or shoot (FIG. 37), so the camera tilts about −15 degrees relative to the z axis to afford a better view of the vicinity of the penalty area (S136, FIG. 38).

When more than 8 m from the penalty area (S134, NO), the direction in which the player advances is determined (S138). When the player is moving toward the viewer (FIG. 39) or away from the viewer (FIG. 40), the angle of the camera in the x-z plane is 0 degrees relative to the player (S140, FIG. 41). When the player is moving to the left (FIG. 42), the angle of the camera relative to the player is −15 degrees from the z axis (S142, FIG. 43). When the player is moving to the right (FIG. 44), the angle of the camera relative to the player is 15 degrees from the z axis (S144, FIG. 45).

When the ball is the main point of view of the camera (S132, ball side), it is determined whether or not the distance between the ball and player is a prescribed distance, such as 15 m or more (S146). If 15 m or more (S146, YES, FIG. 46), the camera angle is determined so that the eye direction vector from the ball toward the player is at an angle of 20 degrees from the z axis (S154, FIG. 47). When the position between the player and ball is the opposite, relative to the z axis, the camera angle is determined so that the eye direction vector from the ball to the player is −20 degrees (S154, FIG. 48).

Figure 48:
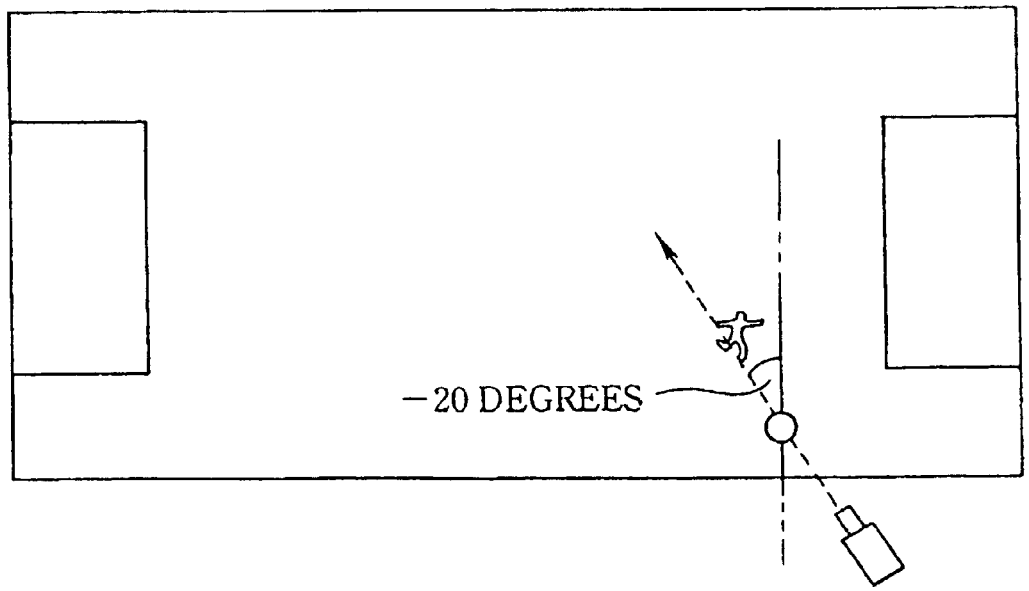
FIG. 48 illustrates another example of the camera angle adjustment when the ball and player are separated by at least 15 m.
Figure 49:
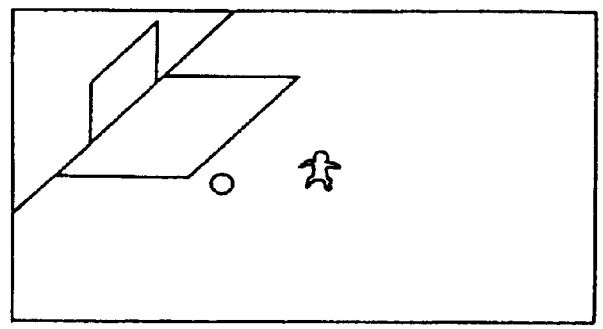
FIG. 49 illustrates a case in which the main point of view of the camera is within 8 m of a penalty area.
Figure 50:
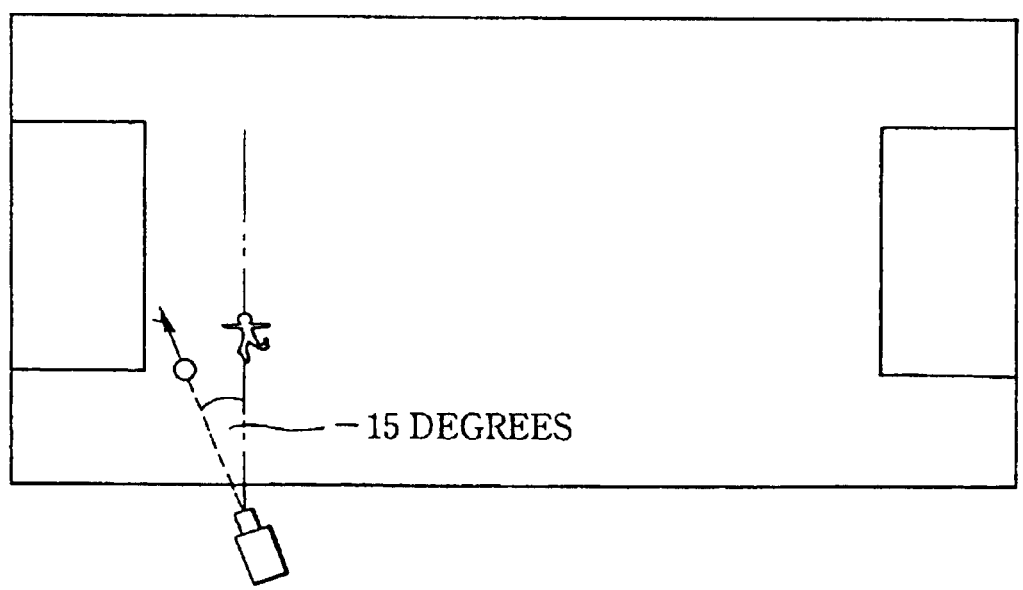
FIG. 50 illustrates the camera angle adjustment when the main point of view of the camera is within 8 m of a penalty area.
Figure 51:
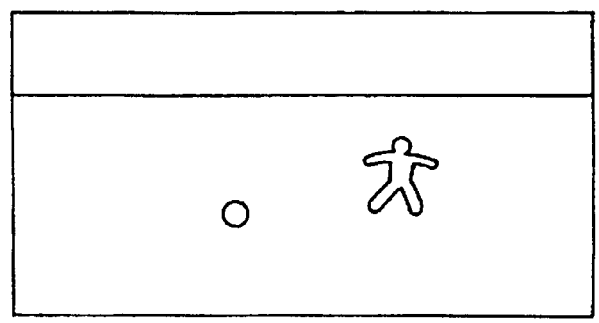
FIG. 51 illustrates a case in which the main point of view is not within 8 m of a penalty area.

When the distance between the ball and player is not a specific distance such as 15 m or more (S146, NO), it is determined whether or not the main point of view of the camera is within 8 m of a penalty area (S148). When the main point of view of the camera is within 8 m of the penalty area (S148, YES, FIG. 49), the eye direction vector of the camera is set to an angle of −15 degrees (FIG. 50). When the position between the ball an player is the opposite, as shown in FIG. 48, the direction of the camera is set 15 degrees from the z axis.

Figure 52:
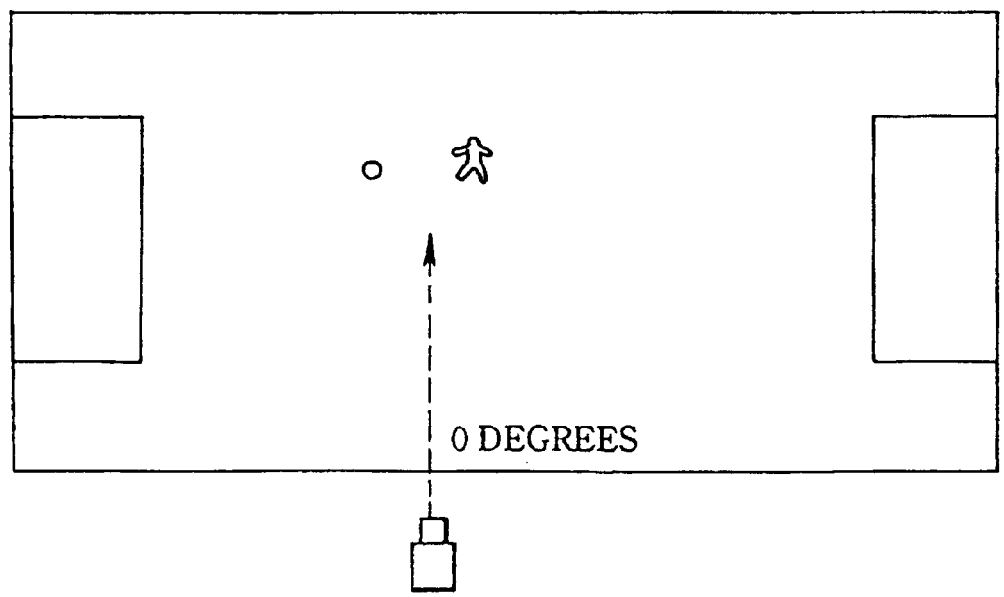
FIG. 52 illustrates the camera angle adjustment when the main point of view is not within 8 m of a penalty area.

When the distance between the ball and player is within 15 m, and the main point of view of the camera is not with 8 m of the penalty area (S148, NO, FIG. 51), the eye direction vector of the camera is set to 0 degrees relative to the ball (0 degrees relative to the z axis) (FIG. 52). When these processes are concluded, the system returns to the main program.

Occasionally, it becomes difficult to play at right angles to the direction in which the player on the screen is moving in cases where player movement in the x and z directions is input by the game device player using an input device such as a pad or joystick if the camera angle from the z axis is too great when the camera moves along the sidelines. A camera angle of about 15 degrees is thus advantageous.

The camera angle of the player in the x-z plane is thus adjusted according to areas in the game field, affording a better view in the direction in which the ball is advancing.

Figure 53:
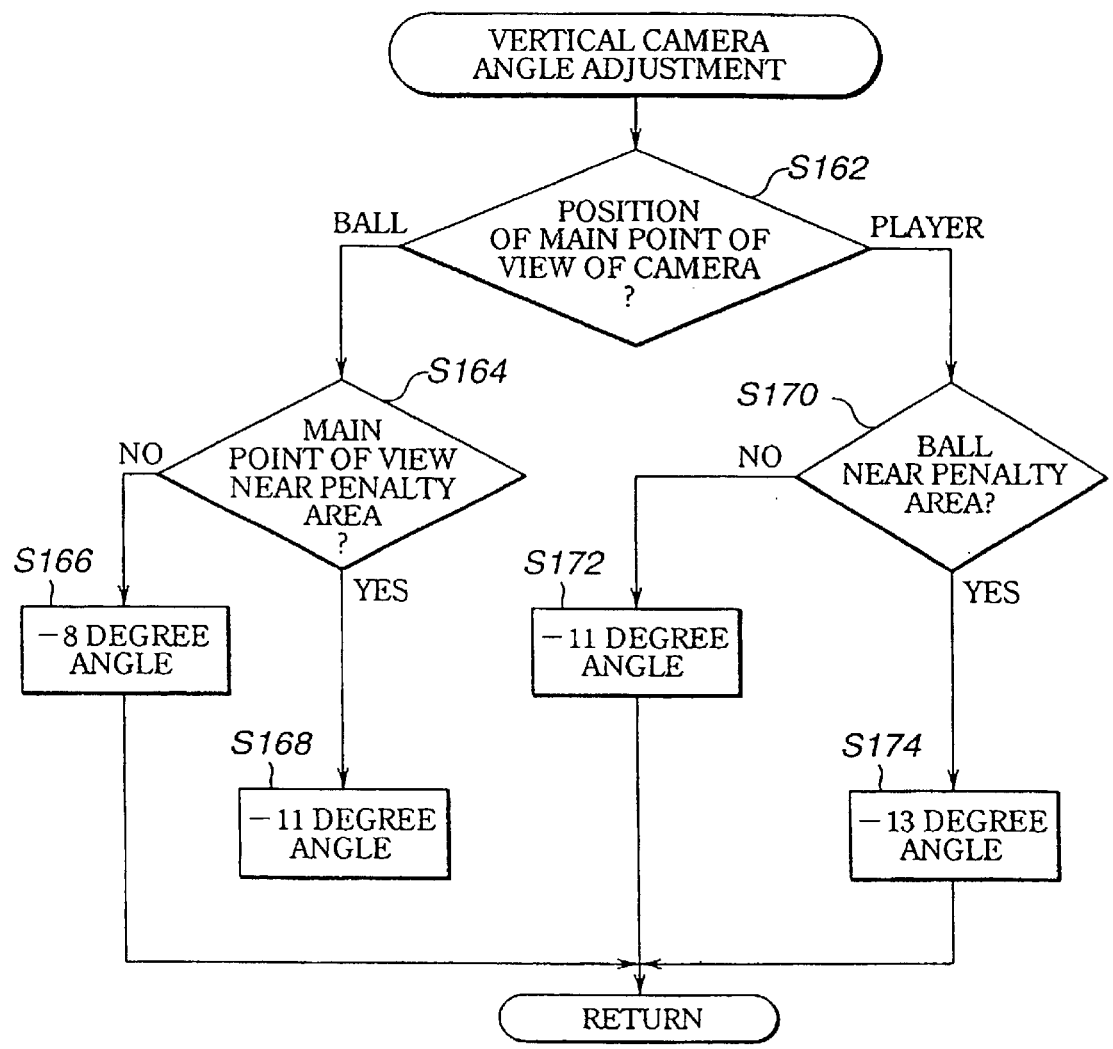
FIG. 53 is a flow chart illustrating the vertical angle ski adjustment of the camera.
Figure 54:
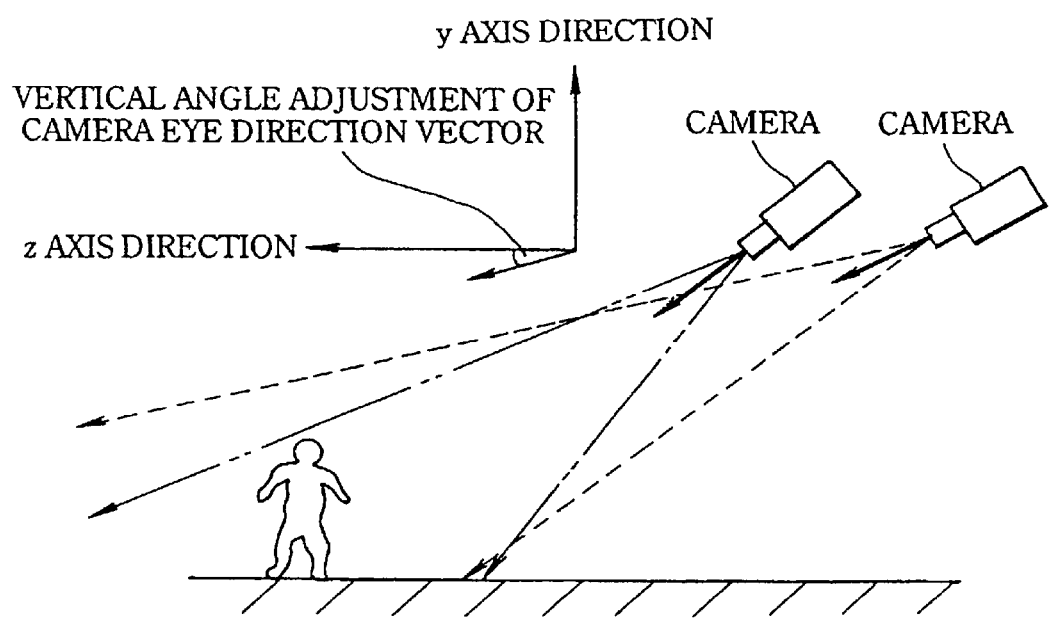
FIG. 54 illustrates the vertical angle adjustment of the camera.

Vertical (y axis direction) camera angle adjustment is described below. FIG. 53 is a flow chart of the process for adjusting the vertical camera angle, which is executed according to prescribed timing (conditions) determined in the main program not shown in the figure. The camera height position is usually set, but not limited, to a height of about 10 m. The main routine, as shown in FIG. 54, establishes the angle at which the camera tracks the game field according to game areas. That is, the position of the main point of view of the camera is determined (S162). When the player is the main point of view (S162, player), it is determined whether or not the main point of view is near the penalty area (S164). When the main point of view is not near the penalty area (S164, NO), the camera direction is determined so that the eye direction vector of the camera is −8 degrees from the z axis, to afford a relatively broad range of vision (S166). Here, when the camera looks down, the angle is negative, when it looks up, the angle is positive, and when it is level, the angle is 0. When the main point of view is near a penalty area (S164, YES), the camera direction is determined so that the eye direction vector of the camera is −11 degrees from the z axis (S168). This allows the camera to give a better view overlooking the field, resulting in images with a better sense of depth and dimension.

When the ball is the main point of view (S162, ball), it is determined whether or not the main point of view is near a penalty area (S170). When the main point of view is not near the penalty area (S170, NO), the camera direction is determined so that the line of sigh vector of the camera is −11 degrees from the z axis (S166). When the main point of view is near the penalty area (S170, YES), the camera direction is set so that the eye direction vector of the camera is −13 degrees from the z axis (S174).

Upon the conclusion of these processes, the system returns to the main program.

Figure 55:
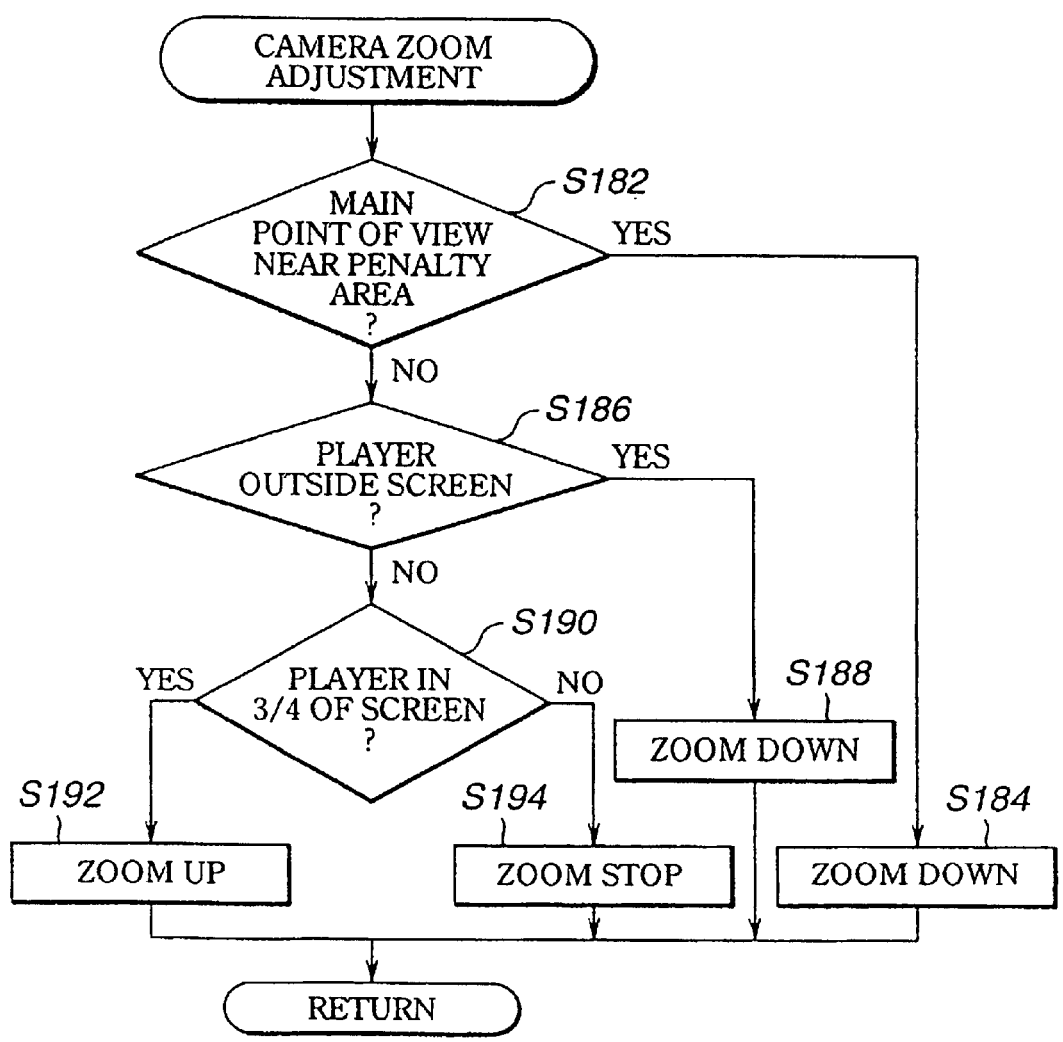
FIG. 55 is a flow chart illustrating the camera zoom adjustment.

FIG. 55 is a flow chart of the camera zoom adjustment. When it is determined in the main program that camera zoom adjustment is needed, the process moves to the main routine.

First, it is determined whether or not the main point of view of the camera is near a penalty area (S182). When it is near a penalty area, the camera zooms down to a prescribed distance from the main point of view (S184). This allows the entire penalty area to be seen.

Figure 56:
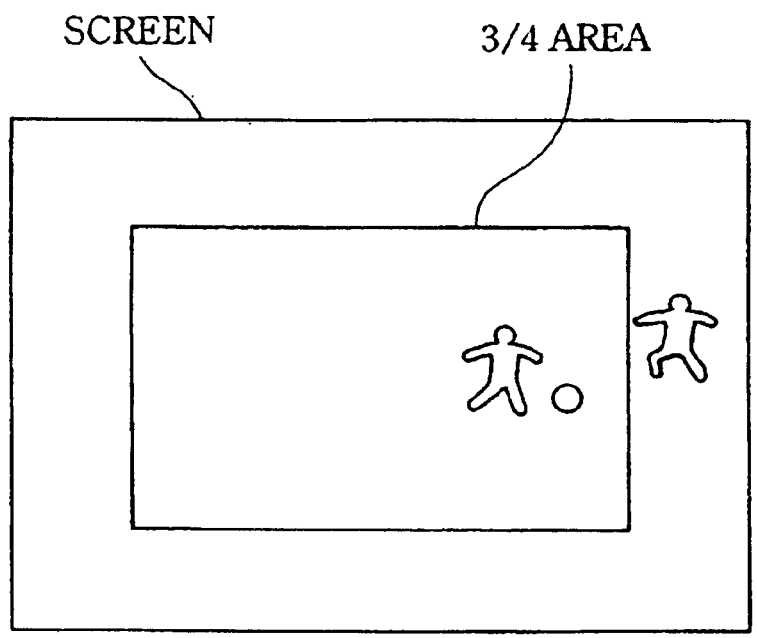
FIG. 56 illustrates an area in which the player is present on the screen.

When the main point of view of the camera is not near the penalty area (S182, NO) and the player is outside the screen (S186, YES), the camera zooms down to project the player in the screen (S188). As shown in FIG. 56, when the player is in the screen (S186, NO) and the player is in ¾ of the screen (S190, YES), the camera zooms up to a prescribed distance from the main point of view (S190). This allows close ups of players in situations where a fixed range is not visible. When the player is projected on the screen but is in ¾ of the screen (S190, NO), the distance between the camera dn main point of view is maintained (S194).

Figure 57:
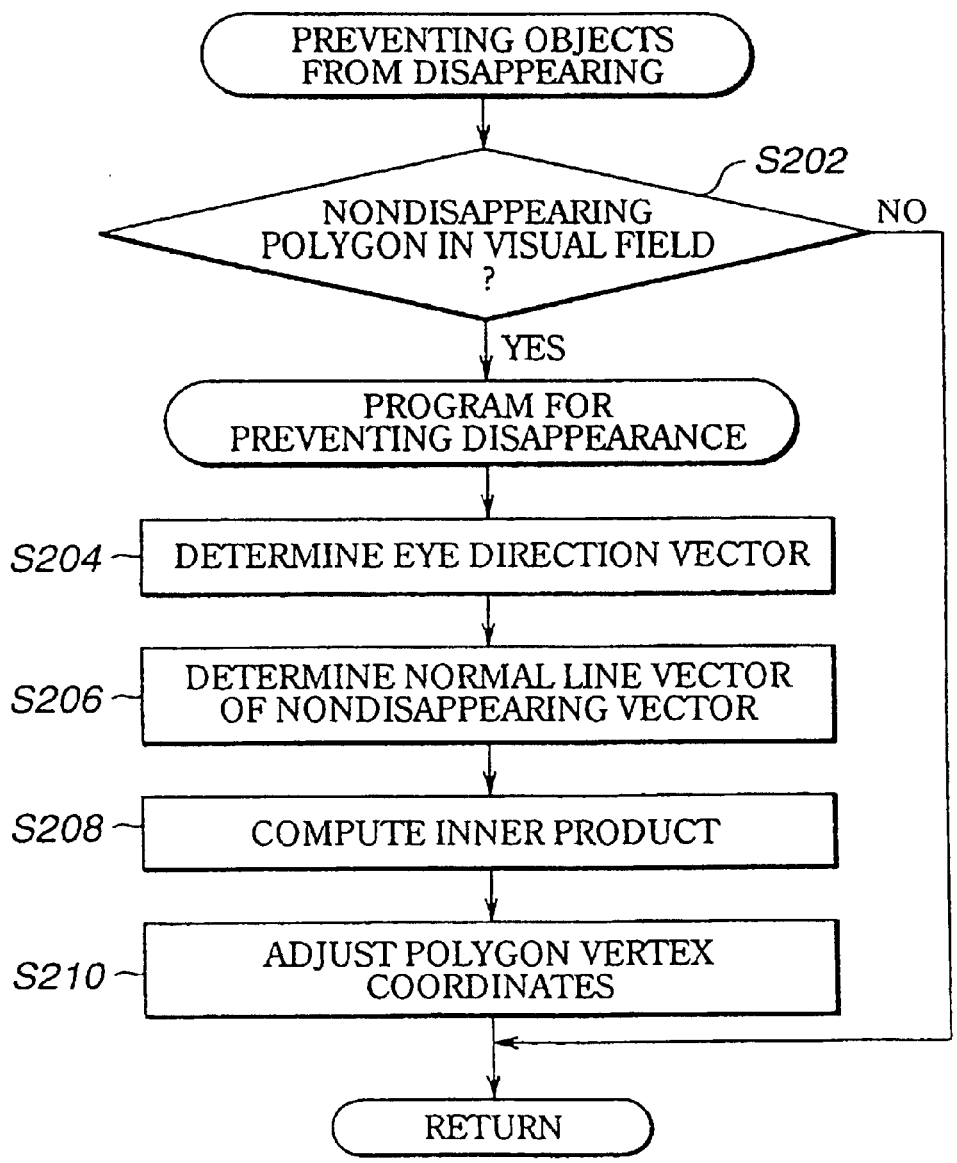
FIG. 57 is a flow chart illustrating another example of an object prevented from disappearing.

FIG. 57 is a flow chart of another example enabling the display of objects which should be prevented from disappearing on the screen, such as the aforementioned line polygons.

In the figure, attribute data indicating that an object is to be prevented from disappearing is added to the data of polygons which should be prevented from disappearing. When object groups in the visual field of the virtual camera are displayed on the screen, the computer system determines whether or not there are polygons which are to be prevented from disappearing in the visual field (S202).

Figure 58:
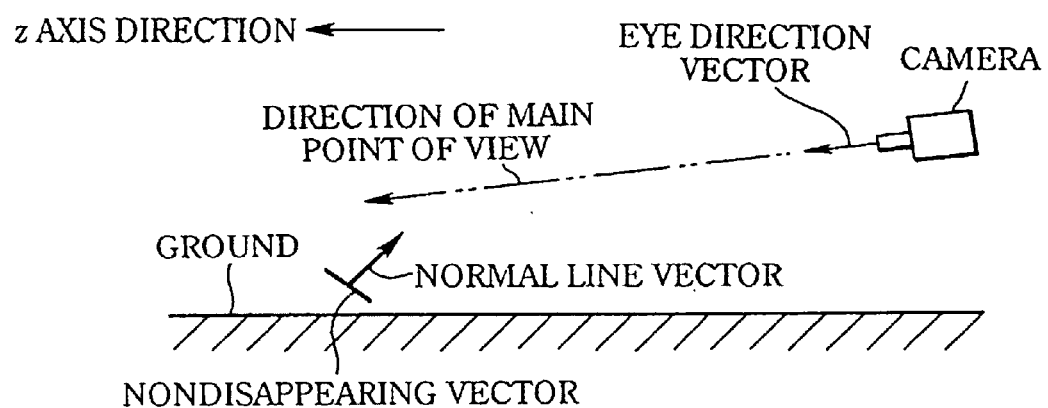
FIG. 58 illustrates an object prevented from disappearing.

When there are polygons which should be prevented from disappearing, such as line polygons (S202, YES), a program that prevents polygons from disappearing is actuated. That is, as shown in FIG. 58, a unit eye direction vector is determined from the main point of view of the camera and the position of the camera (S204). The unit normal line vector is determined from the data for polygons which are to be prevented from disappearing (S206). The angle between the unit eye direction vector and the unit normal line vector is determined. This can be determined as the inner product of the unit eye direction vector and the unit normal line vector (S208). The polygon vertex coordinate values are adjusted so that the angle is at a prescribed angle (S210). The process from step 204 to step 210 is executed for each polygon that is to be prevented from disappearing in the visual field. Here, step 202 corresponds to means for preventing such disappearance, steps 204 through 208 correspond to angle computing means, and step 310 corresponds to polygon tilting means.

This allows lines and the like that are indispensable for a game to be prevented from disappearing.

The present invention is not limited to soccer games, and is applicable for a variety of games in which a ground or court is described by lines, such as tennis, baseball, basket ball, volley ball, Rubgy, and American football.

Camera zooming is thus adjusted according to area and display status.

A program for executing the aforementioned image processing device and for executing the method for displaying images on a computer system may be provided as a recording on data recording media such as CD-ROMs, DVD-ROMs, and ROM cassettes.

The embodiment described with reference to FIGS. 8 through 17 is not limited to embodiments in which the surfaces of polygons A through D" are mapped with textures of spectators facing the playing field, that is, examples of display objects displayed in three-dimensional virtual space serving as the game space. For example, among the textures mapped to polygon surfaces, portions of the background other than display objects modeled on spectators may be used as transparent bit textures, and portions of the display objects may be used as opaque bit textures.

Figure 59:
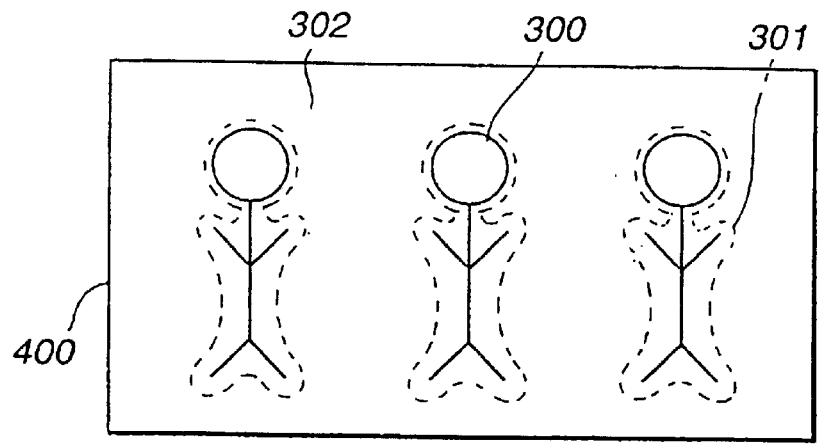
FIG. 59 is another example of texture including spectators.
Figure 60:
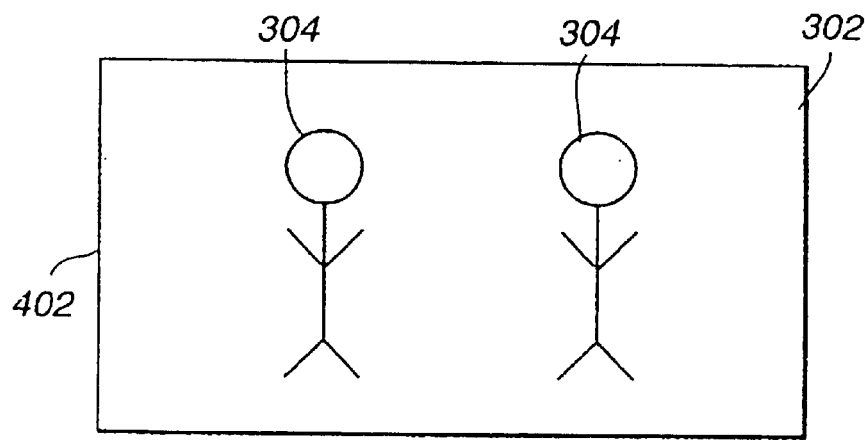
FIG. 60 is another example thereof.
Figure 61:
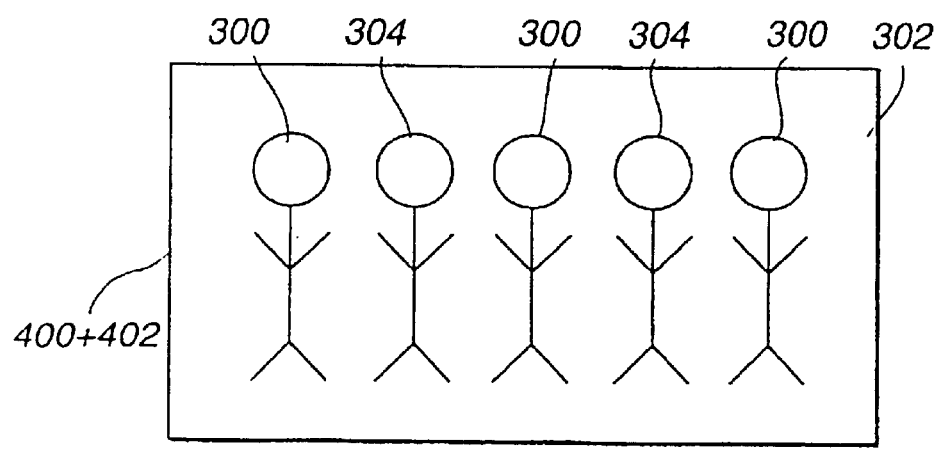
FIG. 61 is an embodiment of texture display when polygons mapped with textures are superposed.

FIG. 59 is a schematic of such textures. The opaque bit texture area includes the spectator display objects 300 and surrounding portions 301 as needed. FIG. 60 is an example of texture related to another spectator embodiment. The background 302 is similarly transparent bits, and the characters 304 are opaque bits. This texture is mapped to polygons other than polygons mapped with the texture in FIG. 59, and polygons mapped with the texture in FIG. 60 are arranged in front of the polygons mapped with the texture in FIG. 59, that is, more on the virtual point of view side. FIG. 61 shows a state in which these textures are layered, that is, superposed, as shown in FIGS. 8 through 17. The characters 304 in FIG. 60 are superposed on the transparent back ground portion of FIG. 59. Accordingly, when the polygons in FIGS. 59 and 60 are superposed, spectators with the two textures are displayed on the screen while blended, grouped, and superposed. When spectators which are these polygon characters are superposed, the spectators toward the bottom in three-dimensional space, that is, spectators of polygons having the lowest priority, are under polygons having the highest priority, and are not displayed on the screen.

Spectator movements can be reproduced or simulated in the same manner as the previous embodiment of spectator behavior by moving a plurality of polygons mapped with such textures along planes perpendicular or otherwise intersecting the direction in which the plurality of polygons are superposed, or in a direction intersecting the virtual camera facing polygons A through D" in three-dimensional space, or in a direction intersecting the direction in which they are superposed, as shown in FIGS. 8 through 17.

Figure 62:
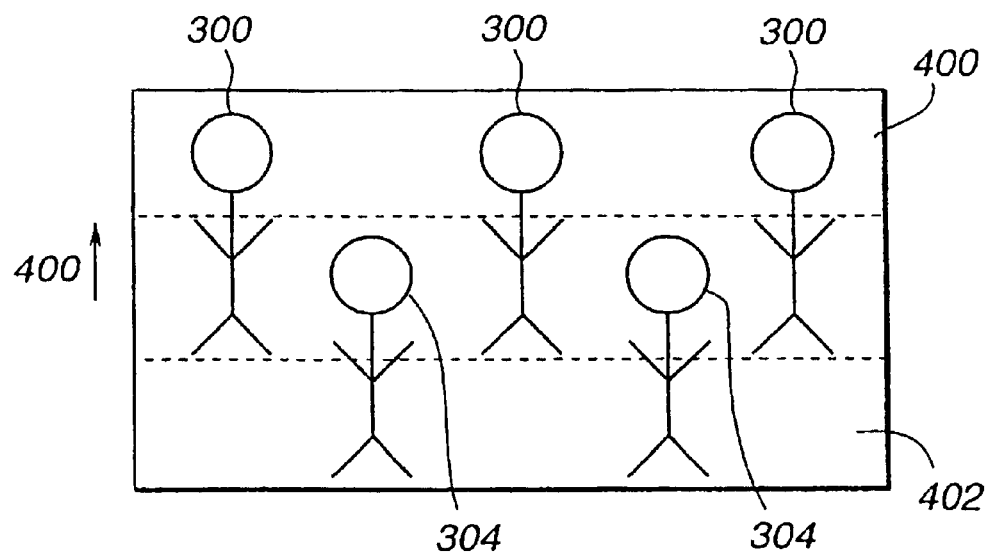
FIG. 62 is an embodiment for moving polygons.
Figure 63:
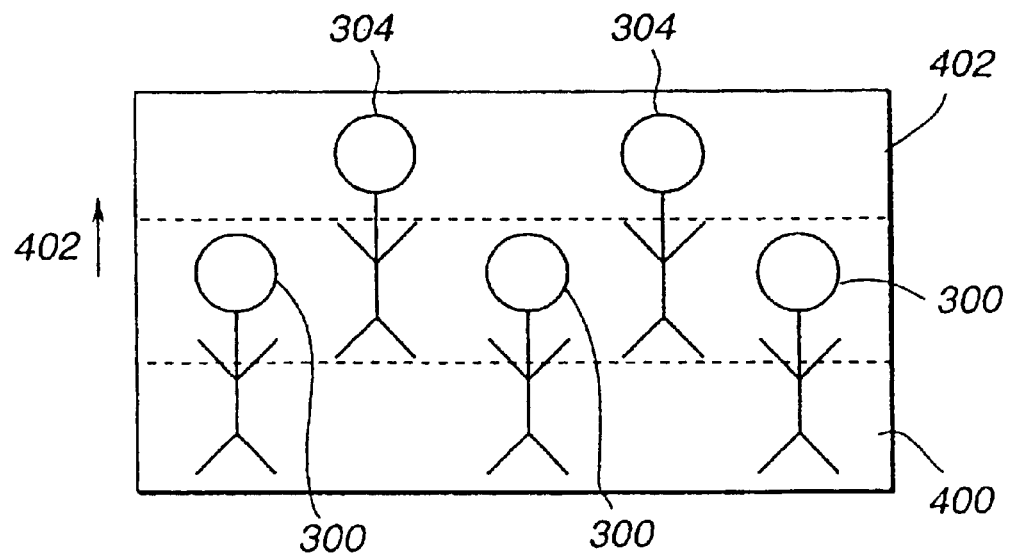
FIG. 63 is another embodiment.

FIGS. 62 and 63 are of a case in which the polygons 400 described in FIG. 59 the polygons 402 described in FIG. 60 are superposed, where FIG. 62 shows the polygons 400 moving up, and FIG. 63 shows the polygons 402 moving up.

Thus, in the present invention, movements such as that of several display objects moving as in the case of spectators around a soccer game field, movements of groups consisting of several display objects, and movements in cases where several display objects are preferably divided into several blocks and are moved while the blocks are controlled (movements of animals and insects) can be created more efficiently. Such movements are produced in specific modes, such as in the case of soccer games and when athletes competing over a ball make a goal. It bears repeating that the textures described here may be picture data including characters such as spectators and background (clouds, waves, etc.). In addition, instead of constructing the background portions in FIG. 59 with transparent textures, texture of a single may be used, and the texture in FIG. 60 may be constructed of texture with another color distinguishable from this single color. Furthermore, the background portion of FIG. 60 may be made of a single color texture, and the background portion of FIG. 59 can be used as it is with transparent colors, while at least the profiles of the characters in FIG. 59 are not the aforementioned single color. In the case of FIGS. 8 through 17, the polygons were arranged in, but are not limited to, positions so as to be gradually inclining upward in virtual space, so the polygons can also be arranges in a virtually level plane.

In the aforementioned embodiments, the eyes of a character were directed at a target when it was determined whether or not the relation to the game contents or the positional relation such as the distance between characters and the target having a relation through the game to the aforementioned characters matched certain conditions, so that when a character competed while dribbling a ball in a soccer game, for example, the character looked in (surveyed) other directions to look for team mates or kicking zones, allowing the behavior of actual soccer contestants to be more realistically simulated, providing more natural movements, and achieving greater realism and immediacy.

The control of the point of view provides effects such as 1) affecting the strategies used in the game and the level of game difficulty, and 2) making it easier to understand and play situations or points to which the ball can (should) be passed based on the behavior of characters in the possession of the ball in ball games.

In the embodiments, a plurality of polygons mapped with texture modeled on a plurality of spectators are virtually superposed, and the plurality of polygons are moved in a direction intersecting the direction in which they are superposed, so that the variegated movements (more realistic behavior) of individual spectators can be represented. Software design is simplified, the computing load is reduced, and memory capacity can be reduced. These and other demands can be simultaneously addressed, and game immediacy can be further enhanced.

Also in the embodiments, the time of the game being played by a game device player is sensed, and the screen colors for the images are determined according to that time by corrections based on screen colors previously optimized for games, so that presentations with changes in the screen colors are added according to the time in which the game is being played, allowing the screen colors to be constantly maintained in such a way as to avoid interfering with the game. It is also possible to avoid the drawbacks that occur when the screen color state is adjusted using only the luminance, as in the past, and it is furthermore possible to more consistently and accurately make the changes in brightness throughout the day compatible with the color state of the display screen, further enhancing game immediacy.

Polygons which are difficult to see in virtual space due to the camera position sometimes occur in games which develop in three-dimensional virtual space, so in another embodiment, line objects drawn on the ground, for example, are prevented from disappearing by means of image processing.

Yet another embodiment affords a game device for adjusting the camera position, camera direction, range of visual field, and the like according to the direction in which the objects move or game areas, resulting in a screen that makes games easier to play.

INDUSTRIAL APPLICABILITY

As described above, the image processing device of the present invention allows simulations (such as games) in virtual space to be displayed more visibly and with more immediacy for observers (such as individuals playing the game device). The invention is particularly suitable for video (or television) game devices.

What is claimed is:

1. An image processing device for situating objects in virtual space by a computer system, developing a game while controlling the movements of said objects according to input control and set rules, and displaying circumstances in said virtual space as the screen seen from a virtual camera, wherein said image processing device comprises:

polygons forming lines situated along a reference plane serving as the reference in said virtual space such that the reference plane and the polygons have a predetermined, fixed relationship to one another;

determination means for determining the positional relationship between said polygons and said virtual camera; and polygon tilting means for tilting said polygons, according to the results of the determination, so as to increase the surface area of said polygons seen from said virtual camera to improve the visibility of the polygons from the virtual camera; wherein said polygon tilting means tilts said polygons only when the polygons forming lines are at least a predetermined distance away from the virtual camera.

2. The image processing device according to claim 1, wherein said reference plane is the ground, and said polygons are polygons forming lines situated on said ground.

3. The image processing device according to claim 1, wherein said polygons are quadrilateral, and said polygon tilting means modifies the coordinate values of the vertices on one of the sides of mutually facing sides of said polygons.

4. The image processing device of claim 1, wherein said polygons are lines on a field in a ball game and said objects are participants in the ball game and a ball.

5. An image processing device having an image generating display means for converting virtual space constructed with a three-dimensional model including a plurality of polygons to two-dimensional images seen from a virtual camera in any position, and displaying them on a display device, wherein said image processing device comprises:

angle computing means for computing the angle between an eye direction vector showing the direction in which said virtual camera is facing and a normal line vector showing the orientation of the plane of certain polygons situated in said virtual space; and polygon tilting means for changing the coordinate values of the vertices of said polygons, so that the angle computed by said angle computing means assumes a desired value, such that the visibility of the polygons from the virtual camera is improved; wherein the shape of an object formed by the polygons is modified such that the visible area thereof is increased.

6. Data recording media including a program to enable a computer system to function as an image processing device according to any of claims 1 through 3, and 5.

7. An image processing device for displaying circumstances in virtual three-dimensional space in the form of images seen from a camera, wherein said image processing device comprises:

polygons forming lines situated along a reference plane serving as a reference in said virtual three-dimensional space such that the reference plane and the polygons have a predetermined, fixed relationship to one another;

determination means for determining the positional relationship between said polygons and said virtual camera; and polygon tilting means for tilting said polygons, according to the results of the determination by said determination means, so as to increase the surface area of said polygons seen from the virtual camera to improve the visibility of the polygons from the virtual camera; wherein said polygon tilting means tilts said polygons only when the polygons forming lines are at least a predetermined distance away from the virtual camera.

8. An image processing device for displaying circumstances in virtual three-dimensional space in the form of images seen from a virtual camera, wherein said image processing device comprises:

polygons forming lines situated along a reference plane serving as a reference in said virtual three-dimensional space such that the reference plane and the polygons have a predetermined, fixed relationship to one another;

determination means for determining the positional relationship between said polygons and said virtual camera; and polygon tilting means for tilting said polygons, according to the results of the determination by said determination means, so as to allow the vertices in the interior, relative to said virtual camera, of said polygons to stand out from said reference plane, while centered on the vertices in the from, relative to said virtual camera, of said polygons; wherein said polygon tilting means tilts said polygons only when the polygons forming lines are at least a predetermined distance away from the virtual camera.

9. A game machine, characterized by comprising an image processing device according to claim 7 or 8, for executing a game by situating objects in said virtual three-dimensional space and by controlling said objects according to player input control and set rules.

10. The game device according to claim 9, characterized in that said game is a game in which objects are situated in a game field formed on a reference plane, and said polygons are polygons forming lines designating boundaries of said game field.

11. An image processing device for displaying circumstances in virtual three-dimensional space in the form of images seen from a virtual camera, wherein said image processing device comprises:

polygons forming lines situated in said virtual three-dimensional space;

determination means for determining the positional relationship between said polygons and said virtual camera; and polygon tilting means for tilting said polygons, according to the results determined by said determination means, so as to increase the surface area of said polygons as seen from the virtual camera to improve the visibility of said polygons; wherein said polygon tilting means tilts said polygons only when the polygons forming lines are at least a predetermined distance away from the virtual camera.

12. The image processing device according to claim 7, 8 or 11, characterized in that said polygons are polygons that show lines.

13. A game device, characterized by comprising an image processing device according to claim 11, for executing a game by situating objects in said virtual three-dimensional space and by controlling said objects according to player input control and set rules.

14. The game device according to claim 13, characterized in that said game is a game in which objects are situated on a plane, and said polygons are polygons forming lines described on said plane.

15. A game device for situating objects in virtual space formed in a computer system, developing a game while controlling the movements of said objects according to input control and set rules, and displaying circumstances in said virtual space on a screen as seen from a virtual camera, said game device comprising:

polygons forming boundary lines of a game field situated along a reference plane serving as a reference in a virtual space such that the reference plane and the polygons have a predetermined, fixed relationship to one another; and a position changing means for changing positions of said polygons to enlarge an area of said polygons according to the angle relationship between said virtual camera and said polygons, such that the visibility of the polygons from the virtual camera is improved.

16. The game device of claim 15, wherein said objects are participants in a ball game and a ball.

17. An image processing device for situating objects in virtual space by a computer system, developing a game while controlling the movements of said objects according to input control and set rules, and displaying circumstances in said virtual space as the screen seen from a virtual camera, wherein said image processing device comprises:

polygons forming lines situated along a reference plane serving as the reference in said virtual space such that the reference plane and the polygons have a predetermined, fixed relationship to one another;

determination means for determining the positional relationship between said polygons and said virtual camera; and polygon tilting means for tilting said polygons, according to the results of the determination, so as to increase the surface area of said polygons seen from said virtual camera to improve the visibility of the polygons from the virtual camera; wherein said polygon tilting means tilts said polygons when the polygons forming lines are at least a predetermined distance away from the virtual camera.

18. An image processing device for displaying circumstances in virtual three-dimensional space in the form of images seen from a virtual camera, wherein said image processing device comprises:

polygons forming lines situated along a reference plane serving as a reference in said virtual three-dimensional space such that the reference plane and the polygons have a predetermined, fixed relationship to one another;

determination means for determining the positional relationship between said polygons and said virtual camera; and polygon tilting means for tilting said polygons, according to the results of the determination by said determination means, so as to increase the surface area of said polygons seen from the virtual camera to improve the visibility of the polygons from the virtual camera; wherein said polygon tilting means tilts said polygons when the polygons forming lines are at least a predetermined distance away from the virtual camera.

19. An image processing device for displaying circumstances in virtual three-dimensional space in the form of images seen from a virtual camera, wherein said image processing device comprises:

polygons forming lines situated along a reference plane serving as a reference in said virtual three-dimensional space such that the reference plane and the polygons have a predetermined, fixed relationship to one another;

determination means for determining the positional relationship between said polygons and said virtual camera; and polygon tilting means for tilting said polygons, according to the results of the determination by said determination means, so as to allow the vertices in the interior, relative to said virtual camera, of said polygons to stand out from said reference plane, while centered on the vertices in the from, relative to said virtual camera, of said polygons; wherein said polygon tilting means tilts said polygons when the polygons forming lines are at least a predetermined distance away from the virtual camera.

20. An image processing device for displaying circumstances in virtual three-dimensional space in the form of images seen from a virtual camera, wherein said image processing device comprises:

polygons forming lines situated in said virtual three-dimensional space;

determination means for determining the positional relationship between said polygons and said virtual camera; and polygon tilting means for tilting said polygons, according to the results determined by said determination means, so as to increase the surface area of said polygons as seen from the virtual camera to improve the visibility of said polygons; wherein said polygon tilting means tilts said polygons when the polygons forming line are at least a predetermined distance away from the virtual camera.

21. A game image processing method using a game device for situating objects in virtual space by a computer system, developing a game while controlling the movements and positions of said objects, and displaying images in said virtual space as a screen seen from a virtual camera positioned at a predetermined viewpoint, said game image processing method comprising the steps of:

determining a positional relationship between a line polygon situated along a reference plane serving as a reference in said virtual space and said virtual camera, based on a positional coordinate of the line polygon, a positional coordinate of said viewpoint, and a distance and an angle between said line polygon and said virtual camera; and changing a positional coordinate of a vertex of said line polygon such that an area of said line polygon increases as viewed from said virtual camera.

22. The game image processing method of claim 21, further comprising the step of:

adjusting a direction of said virtual camera based on a moving direction of an object controlled by an input signal that is input by a player controlling an input device.

23. The game image processing method of claim 21, further comprising the step of:

adjusting a direction of said virtual camera based on a position of an object controlled by a player and an attention point of said virtual camera corresponding to a predetermined area of said virtual space.

24. The game image processing method of claim 23, further comprising the step of:

zooming said virtual camera based on said attention point of said virtual camera and said position of said object controlled by said player.

25. The game image processing method of claim 21, wherein said reference plane is the ground, and said line polygons are polygons forming lines situated on said ground.

26. The game image processing method of claim 21, wherein said line polygons are lines on a field in a ball game and said objects are participants in the ball game and a ball.

27. A game image processing method using a game device for situating objects in virtual space by a computer system, developing a game while controlling the movements and positions of said objects, and displaying images in said virtual space as a screen seen from a virtual camera positioned at a predetermined viewpoint, said game image processing method comprising the steps of:

determining whether or not said objects are in a field of view of said virtual camera;

computing an angle between an eye direction vector showing the direction in which said virtual camera is facing and a normal vector showing the orientation of a plane of certain polygons situated in said virtual space; and changing coordinate values of vertices of said polygons, such that said angle has a desired value.

28. The game image processing method of claim 27, further comprising the steps of:

adjusting a direction of said virtual camera based on a moving direction of an object controlled by an input signal that is input by a player controlling an input device.

29. The game image processing method of claim 27, further comprising the step of:

adjusting a direction of said virtual camera based on a position of an object controlled by a player and an attention point of said virtual camera corresponding to a predetermined area of said virtual space.

30. The game image processing method of claim 29, further comprising the step of:

zooming said virtual camera based on said attention point of said virtual camera and said position of said object controlled by said player.

31. The game image processing method of claim 27, wherein said reference plane is the ground, and said line polygons are polygons forming lines situated on said ground.

32. The game image processing method of claim 27, wherein said line polygons are lines on a field in a ball game and said objects are participants in the ball game and a ball.

* * * * *